(12) United States Patent
Srinivasan et al.

(10) Patent No.: US 11,895,367 B2
(45) Date of Patent: *Feb. 6, 2024

(54) SYSTEMS AND METHODS FOR RESOLVING RECORDING CONFLICTS

(71) Applicant: Rovi Guides, Inc., San Jose, CA (US)

(72) Inventors: Madhusudhan Srinivasan, Karnataka (IN); Ramesh Alagarsamy, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,434

(22) Filed: Jun. 16, 2022

(65) Prior Publication Data

US 2023/0037684 A1 Feb. 9, 2023

Related U.S. Application Data

(63) Continuation of application No. 17/253,530, filed as application No. PCT/US2018/052935 on Sep. 26, 2018, now Pat. No. 11,395,041.

(51) Int. Cl.

| | | |
|---|---|---|
| *H04N 21/458* | (2011.01) | |
| *G06F 40/289* | (2020.01) | |
| *H04N 21/426* | (2011.01) | |
| *H04N 21/435* | (2011.01) | |
| *H04N 21/439* | (2011.01) | |
| *H04N 21/44* | (2011.01) | |

(52) U.S. Cl.
CPC ....... *H04N 21/4583* (2013.01); *G06F 40/289* (2020.01); *H04N 21/42607* (2013.01); *H04N 21/435* (2013.01); *H04N 21/4394* (2013.01); *H04N 21/44008* (2013.01)

(58) Field of Classification Search
None
See application file for complete search history.

(56) References Cited

U.S. PATENT DOCUMENTS 9,392,324 B1 *  7/2016  Maltar ............. H04N 21/47214
9,883,242 B1     1/2018  Pontual et al.
(Continued)

FOREIGN PATENT DOCUMENTS

JP     2007124383 A   5/2007
WO    2005041191 A    5/2005

OTHER PUBLICATIONS

International Search Report & Written Opinion for International Application No. PCT/US2018/052935 dated Nov. 23, 2019.

*Primary Examiner* — Alexander Q Huerta
(74) *Attorney, Agent, or Firm* — Haley Guiliano LLP

(57) ABSTRACT

Systems and methods are disclosed herein for determining whether a media asset intended to be recorded is actually transmitted at the time and on the source of a scheduled higher-priority recording. Should the intended media asset not be transmitted in a desirable way, or not transmitted at all, the system will instead make a recording of a lower-priority recording that would not have been made because of a conflict. The systems and methods described herein, before making a higher-priority recording, obtain a sample of the media asset included in a received transmission at a scheduled time and compare it to content associated with the media asset scheduled for recording to determine whether to record the received transmission.

20 Claims, 16 Drawing Sheets

(56) References Cited

U.S. PATENT DOCUMENTS

| | | | |
|---|---|---|---|
| 9,900,632 B1 | 2/2018 | Flores Guerra | |
| 11,395,041 B2 | 7/2022 | Srinivasan et al. | |
| 2003/0020484 A1 | 1/2003 | Clinton | |
| 2003/0204848 A1* | 10/2003 | Cheng | H04N 21/4335 |
| | | | 348/E7.054 |
| 2006/0078299 A1 | 4/2006 | Hasegawa | |
| 2008/0267584 A1* | 10/2008 | Green | H04N 21/812 |
| | | | 386/250 |
| 2008/0276284 A1 | 11/2008 | Bumgardner et al. | |
| 2010/0080530 A1 | 4/2010 | Clayton et al. | |
| 2010/0158477 A1 | 6/2010 | Kummer | |
| 2011/0008749 A1 | 1/2011 | Jin et al. | |
| 2011/0085781 A1* | 4/2011 | Olson | H04N 21/47214 |
| | | | 386/296 |
| 2011/0276157 A1* | 11/2011 | Wang | H04L 65/75 |
| | | | 700/94 |
| 2012/0014109 A1 | 1/2012 | Espiau | |
| 2013/0042262 A1* | 2/2013 | Riethmueller | H04N 21/25866 |
| | | | 725/14 |
| 2014/0000379 A1 | 1/2014 | Kar et al. | |
| 2014/0115634 A1* | 4/2014 | Curtis | H04N 21/4828 |
| | | | 725/49 |
| 2015/0110464 A1* | 4/2015 | Jackson | H04N 21/44222 |
| | | | 386/230 |
| 2016/0227281 A1* | 8/2016 | Abuelsaad | H04N 21/2625 |
| 2016/0309227 A1* | 10/2016 | Casagrande | H04N 21/4583 |
| 2018/0132001 A1 | 5/2018 | McCarty et al. | |
| 2020/0014973 A1 | 1/2020 | Stathacopoulos | |
| 2021/0227292 A1 | 7/2021 | Srinivasan et al. | |
| 2021/0392387 A1* | 12/2021 | Rosqvist | H04N 21/44029 |

\* cited by examiner

SYSTEMS AND METHODS FOR RESOLVING RECORDING CONFLICTS

CROSS-REFERENCE TO RELATED APPLICATIONS

This application is a continuation of U.S. patent application Ser. No. 17/253,530, filed Dec. 17, 2020, which is a national stage application under 35 U.S.C. § 371 of International Application PCT/US2018/052935, filed Sep. 26, 2018, the disclosures of which are hereby incorporated by reference herein in their entireties.

BACKGROUND

This disclosure is directed to systems and methods for resolving recording conflicts, and more particularly, to systems and methods for resolving recording conflicts when there are real-time changes to content scheduled for recording.

SUMMARY

Media systems typically have recording devices, such as digital video recorders (DVR) for example, and users often desire recording multiple media assets simultaneously. When the number of desired recordings exceeds the capacities of the recording equipment (e.g., the number of tuners), a recording conflict may result. Recording priorities are often used to ensure in such circumstances that one recording—the recording with the highest priority—is made in lieu of the recording with a lower priority. But should the media asset scheduled for the time and source (e.g., channel) of the higher-priority recording change last-minute, such systems will record whatever media asset was actually transmitted at the time on the source.

Accordingly, to overcome these problems, systems and methods are disclosed herein for determining whether the desired media asset is transmitted at the time and on the source of a scheduled higher-priority recording. Should the desired media asset be transmitted in an undesirable way (e.g., be cut off), or not transmitted at all, the system will instead make a lower-priority recording that would otherwise not have been made because of a conflict.

The systems and methods described herein, before making a higher-priority recording, obtain a sample of the media asset included in a received transmission and compare it to content associated with the media of the scheduled higher-priority recording. If the sample from the received transmission does not match content associated with the higher-priority recording, a recording manager makes a lower-priority recording instead of recording the received transmission. When the sample from the received transmission matches content associated with the higher-priority recording, the recording manager records the received transmission. Therefore, the methods and systems disclosed herein resolve a recording conflict in a way that ensures an actually desired media asset is recorded.

The sample taken from the received transmission may be, for example, a closed caption component, an audio component, and/or a video component. The recording manager may extract phrases from the closed caption component sample and compare the phrases to phrases associated with the higher-priority asset to determine whether the sample from the received transmission matches content associated with the higher-priority asset. For audio samples, the recording manager captures audio clips from the audio component sample and compares them to audio clips associated with the higher-priority asset to determine whether the audio clips match. Finally, the recording manager may extract video frames from the video component sample and compare them to video frames associated with the higher-priority asset to determine whether the sample from the received transmission matches content associated with the higher-priority asset.

The recording manager may retrieve the content associated with the higher-priority asset from the metadata (e.g., program descriptions included in media guide data) for the higher-priority asset. For example, the recording manager may retrieve phrases associated with the higher-priority asset from the program listing information included in the media guide data. Similarly, the recording manager may retrieve video frames associated with the higher-priority asset from a preview image included in the media guide data.

In some embodiments, the recording manager, to improve the reliability of the comparison results, searches for additional media assets associated with the higher-priority asset. For example, the recording manager may determine, using metadata for the higher-priority asset, that the higher-priority asset is part of a series and identify additional media assets belonging to the series. The recording manager retrieves, for example, phrases associated with the higher-priority asset from the additional media assets belonging to the series and compares the retrieved phrases to the sample of the received transmission.

In some embodiments, the systems and methods described herein, before making a higher-priority recording, obtain a sample of the media asset included in a received transmission and compare it to a predetermined set of keywords indicative of a delay or cancellation of the scheduled recording. The recording manager extracts phrases from the sample and compares them to the predetermined set of keywords indicative of a delay or cancellation of the scheduled recording. If the extracted phrases match the predetermined set of keywords, the recording manager records the lower-priority asset that would otherwise not have been recorded. When the sample of the media asset included in the received transmission does not match the predetermined set of keywords indicative of a delay or cancellation of the scheduled recording, the recording manager records the received transmission. Therefore, the methods and systems disclosed herein resolve a recording conflict in a way that ensures an actually desired media asset is recorded.

BRIEF DESCRIPTION OF THE DRAWINGS

The above and other objects and advantages of the disclosure will be apparent upon consideration of the following detailed description, taken in conjunction with the accompanying drawings, in which reference characters refer to like parts throughout, and in which.

DETAILED DESCRIPTION

Figure 1:
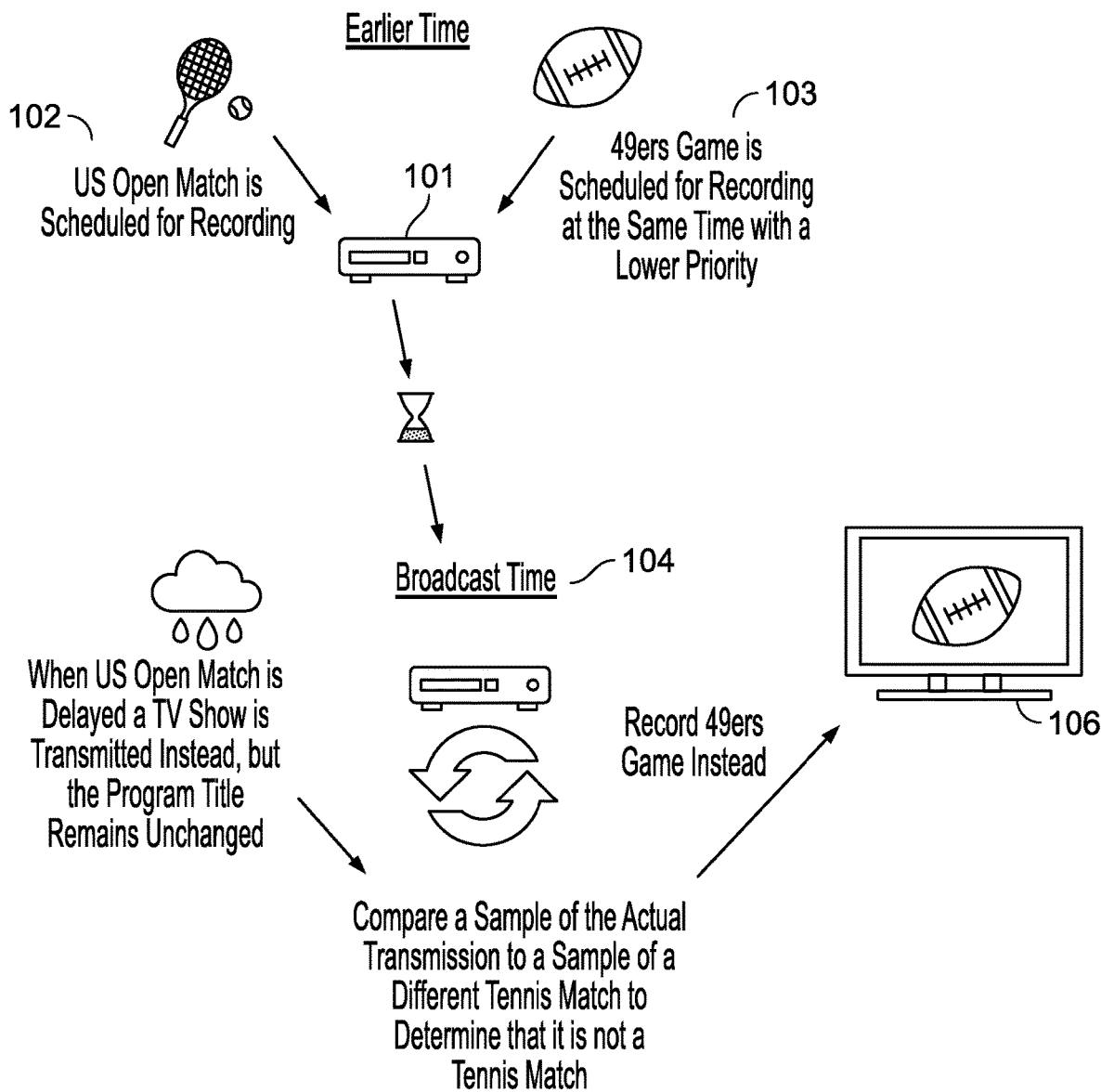
FIG. 1 shows an illustrative example of a scenario of resolving recording conflicts when there are real-time changes to the scheduling of linear media content, in accordance with some embodiments of the disclosure.

FIG. 1 shows an illustrative example of a scenario of resolving recording conflicts when there are real-time changes to the scheduling of linear media content, in accordance with some embodiments of the disclosure. Consider scenario 100, in which a media system comprising recording device 101, such as a digital video recorder (DVR) having a single tuner, receives a higher-priority recording request 102 (e.g., to record a U.S. Open match) and a lower-priority recording request 103 (e.g., to record a football game) with both media assets scheduled to be broadcast at the same time. It should be noted that higher-priority recording request 102 and lower-priority recording request 103 may be received together or separately at any time before broadcast time 104. The media system includes a user interface (e.g., generated for display at monitor 106), and a user sends the requests to record multiple media assets scheduled to be broadcast simultaneously from different sources (e.g., channels). In some embodiments, the user also indicates a recording priority corresponding to the different media assets scheduled for recording.

At broadcast time 104, control circuitry 204 (discussed in greater detail below in connection with FIG. 2), such as the one implemented on recording device 101, receives a transmission from a source for the scheduled higher-priority recording 102. The recording manager determines whether the intended media asset is actually what is transmitted. For example, as illustrated in FIG. 1, the recording manager determines whether the U.S. Open match desired to be recorded is actually transmitted at broadcast time 104. Should the desired media asset be transmitted in an undesirable way (e.g., be cut off), or not transmitted at all, the system will instead make a recording of a lower-priority asset that would not have been made because of a conflict. For example, as illustrated in FIG. 1, the U.S. Open match scheduled to be recorded at broadcast time 104 may be delayed or canceled right before broadcast time 104 (e.g., due to rain) without the program information being updated. The control circuitry 204, implemented on recording device 101, records the football game (i.e., the lower-priority asset) that would not have otherwise been recorded because of the conflict.

Specifically, the recording manager may retrieve content associated with the higher-priority asset from the metadata (e.g., program description included in the program listing on a media guide) for the higher-priority asset. For example, the recording manager may retrieve phrases associated with U.S. Open from the program listing information included in the program listing (e.g., program information provided by ESPN). In some embodiments, the recording manager, to improve the reliability of the comparison, may identify additional content associated with the higher-priority asset to perform the comparisons discussed above (discussed in greater detail below with reference to FIG. 7). For example, the recording manager may store, in a database of recording device 101, additional media assets that were transmitted before broadcast time 104 and their associated metadata. The recording manager may categorize the stored additional media assets based on their associated metadata (e.g., genre such as tennis, football, hockey, etc.). The recording manager, using metadata for the higher-priority asset, identifies additional media assets having metadata related to the metadata for the higher-priority asset from the database. For example, the recording manager, upon receiving higher-priority recording request 102, and based on metadata for the U.S. Open match, identifies other tennis matches (i.e., previously stored additional media assets) stored in the database of recording device 101 having metadata (i.e., their respective program information) related to the metadata for the higher-priority U.S. Open match.

In some embodiments, the recording manager may begin storing additional media assets having metadata related to the metadata for the higher-priority asset after receiving the request to record the higher-priority asset but before receiving the first transmission. For example, recording device 101 may, in response to receiving a request to record the 2018 U.S. Open match, store additional media assets having metadata related to the 2018 U.S. Open match (e.g., additional broadcasts of media assets associated with the genre tennis) prior to broadcast time 104. In some embodiments, the recording manager may store samples of the additional media assets having metadata related to the metadata for the higher-priority asset.

The recording manager may retrieve phrases associated with the higher-priority asset from additional media assets having metadata related to the metadata for the higher-priority asset. For example, the recording manager, upon identifying other tennis matches having metadata related to the metadata for the higher-priority U.S. Open match, retrieves phrases from the other tennis matches as the content associated with the higher-priority U.S. Open Tennis match. The recording manager may also retrieve audio clips and video frames associated with the higher-priority asset from additional media assets having metadata related to the metadata for the higher-priority asset. For example, the recording manager, upon identifying other tennis matches having metadata related to the metadata for the higher-priority U.S. Open match, retrieves audio clips and video frames from other tennis matches as the content associated with the higher-priority U.S. Open Tennis match. In some embodiments, the recording manager may retrieve content associated with the higher-priority asset from external sources such as scraping messages on social media websites discussing the higher-priority asset.

The recording manager obtains a sample of the received transmission and compares the sample to content associated with the higher-priority asset. For example, recording device 101, obtains a sample of the received transmission at broadcast time 104 and compares it to additional tennis matches (i.e., content related to the U.S. Open match intended to be recorded). When the sample of the received transmission does not match content associated with the first media asset, the recording manager records a second media asset having a lower recording priority instead of the received transmission. For example, when the sample of the received transmission at broadcast time 104 does not match the additional tennis matches, the recording manager records the football match (i.e., lower recording priority 103), which would not have been recorded otherwise. Therefore, the recording manager, as shown in FIG. 1, resolves a recording conflict in a way that ensures an actually desired media asset is recorded.

As referred to herein, the term "match" should be understood to mean that the two entities being compared (i.e., sample of the received transmission and content associated with the higher-priority asset) are the same and/or exceed a threshold level of similarity. For example, a phrase from the received transmission is considered to match a retrieved phrase from the content associated with the higher-priority when the two phrases have a greater than 60% overlap. A person possessing ordinary skill in the art will appreciate that any number of threshold values may be set based on predefined preferences and be specific to the type of sample being compared. For example, two audio clips may be considered to match when they are more than 50% similar, but two video frames may be considered to match only when they are more than 75% similar.

Figure 2:
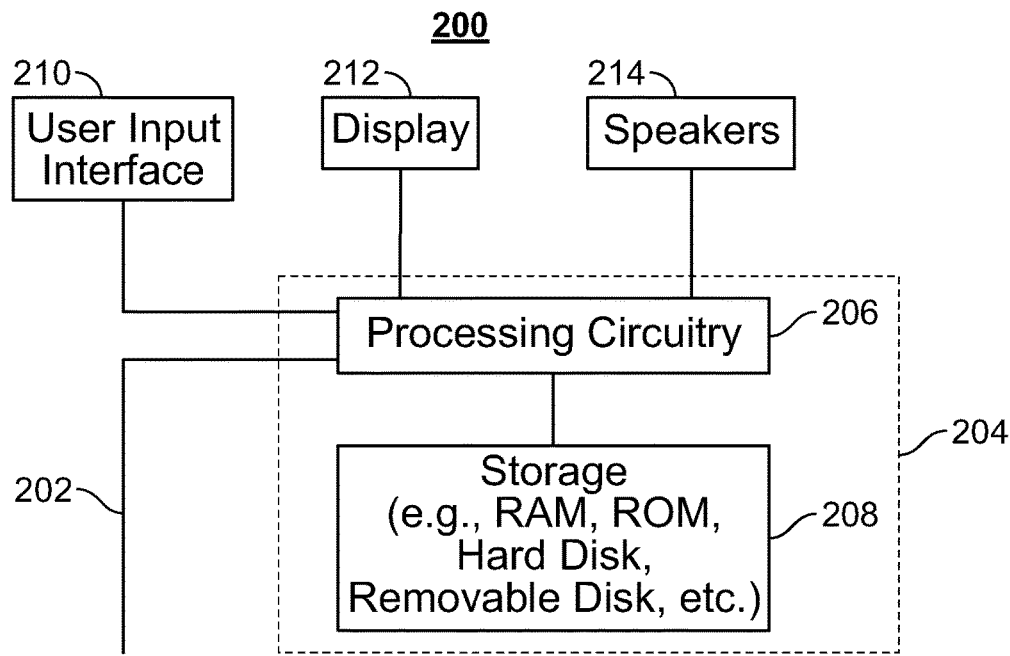
FIG. 2 is a diagram of an illustrative equipment device having a recording manager implemented thereon, in accordance with some embodiments of the disclosure.

FIG. 2 shows a generalized embodiment of an illustrative equipment device 200 (e.g., recording device 101). More specific implementations of equipment devices are discussed below in connection with FIG. 3. Equipment device 200 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for a media application stored in memory (i.e., storage 208). Specifically, control circuitry 204 may be instructed by a recording manager to perform the functions described above and below. For example, the recording manager may provide instructions to control circuitry 204 to generate the user interface displays. In some implementations, any action performed by control circuitry 204 may be based on instructions received from the recording manager. The recording manager may be a stand-alone application, a part of a guide, a part of a middleware of the equipment device 200, or a part of the operating system installed on the equipment device 200 (discussed in greater detail below).

In client-server based embodiments, control circuitry 204 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 3). In addition, communications circuitry may include circuitry that enables peer-to-peer communication of recording devices, or communication of recording devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage may also be used to supplement storage 208 or instead of storage 208.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scalar circuitry for upconverting and downconverting content into the preferred output format of the recording 200. Circuitry 204 may also include digital-to-analog converter circuitry and analog-to-digital converter circuitry for converting between digital and analog signals. The tuning and encoding circuitry may be used by the recording device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from equipment device 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of equipment device 200. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 212 may be HDTV-capable. In some embodiments, display 212 may be a 3D display, and the interactive user interface and any suitable content may be displayed in 3D. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provide as integrated with other elements of equipment device 200 or may be stand-alone units. The audio component of videos and other content displayed on display 212 may be played through speakers 214. In some embodiments, the audio may be distributed to a receiver (not shown), which processes and outputs the audio via speakers 214.

The recording manager may be implemented using any suitable architecture. For example, it may be a stand-alone application wholly-implemented on equipment device 200. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was also selected.

In some embodiments, the recording manager is a client-server based application. Data for use by a thick or thin client implemented on equipment device 200 is retrieved on-demand by issuing requests to a server remote to the equipment device 200. In one example of a client-server based recording manager, control circuitry 204 runs a web browser that interprets web pages provided by a remote server. For example, the remote server may store the instructions for the application in a storage device. The remote server may process the stored instructions using circuitry (e.g., control circuitry 204) and generate the displays discussed above and below. The client device may receive the displays generated by the remote server and may display the content of the displays locally on equipment device 200. This way, the processing of the instructions is performed remotely by the server while the resulting displays are provided locally on equipment device 200. Equipment device 200 may receive inputs from the user via input interface 210 and transmit those inputs to the remote server for processing and generating the corresponding displays. For example, equipment device 200 may transmit a communication to the remote server indicating that an up/down button was selected via input interface 210. The remote server may process instructions in accordance with that input and generate a display of the application corresponding to the input (e.g., a display that moves a cursor up/down). The generated display is then transmitted to equipment device 200 for presentation to the user.

Figure 3:
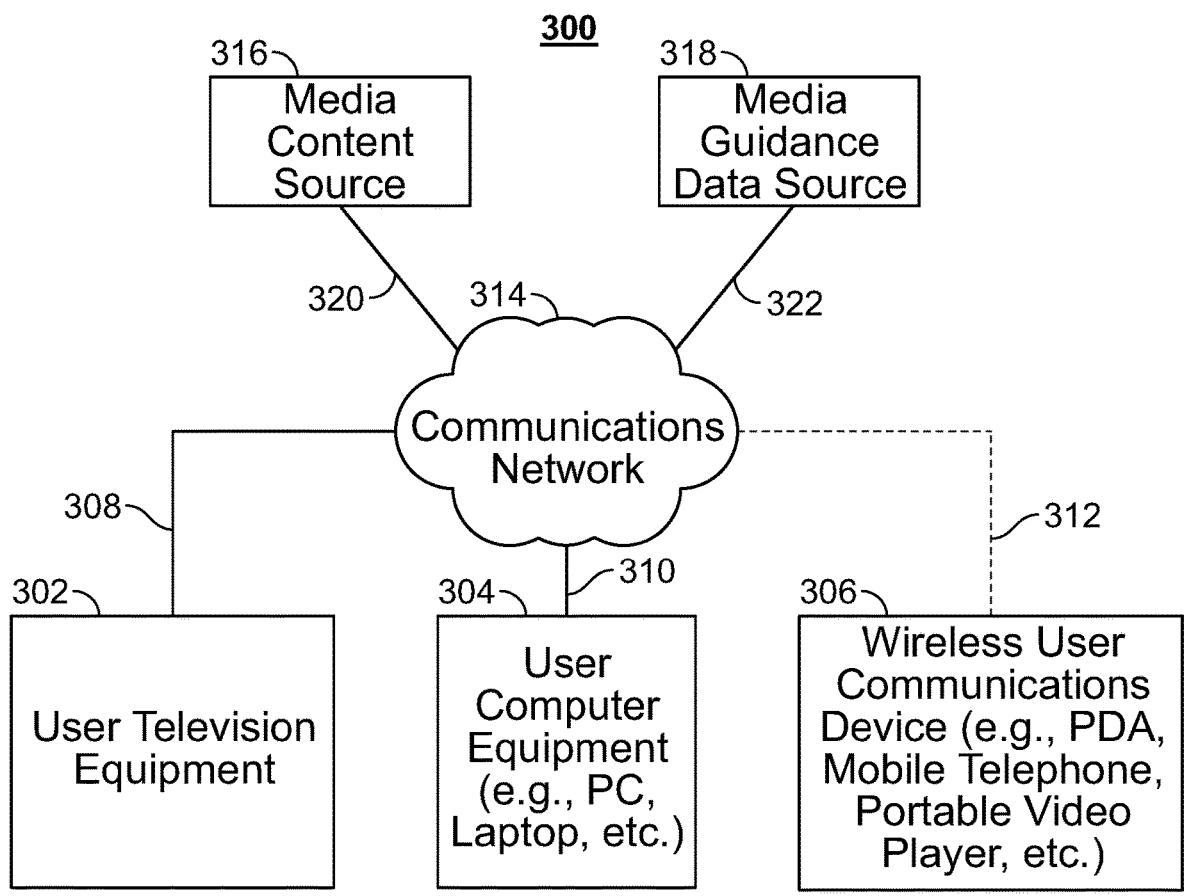
FIG. 3 is a diagram of an illustrative media system in accordance with some embodiments of the disclosure.

Equipment device 200 of FIG. 2 can be implemented in system 300 of FIG. 3 as user television equipment 302, user computer equipment 304, wireless user communication device 306, or any other type of recording suitable for accessing content, such as a non-portable gaming machine. For simplicity, these devices may be referred to herein collectively as recording or recording devices and may be substantially similar to recording devices described above. Recording devices, on which a recording manager may be implemented, may function as a standalone device or may be part of a network of devices. Various network configurations of devices may be implemented and are discussed in more detail below.

A recording device utilizing at least some of the system features described above in connection with FIG. 2 may not be classified solely as user television equipment 302, user computer equipment 304, or a wireless user communications device 306. For example, user television equipment 302 may, like some user computer equipment 304, be Internet-enabled allowing for access to Internet content, while user computer equipment 304 may, like some television equipment 302, include a tuner allowing for access to television programming. The recording manager may have the same layout on various different types of recording or may be tailored to the display capabilities of the recording. For example, on user computer equipment 304, the guidance application may be provided as a web site accessed by a web browser. In another example, the guidance application may be scaled down for wireless user communications device 306.

In system 300, there is typically more than one of each type of recording device but only one of each is shown in FIG. 3 to avoid overcomplicating the drawing. In addition, each user may utilize more than one type of recording device and also more than one of each type of recording device.

The recording devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless, if desired). Communications with the recording devices may be provided by one or more of these communications paths but are shown as a single path in FIG. 3 to avoid overcomplicating the drawing.

Although communications paths are not drawn between recording devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The recording devices may also communicate with each other directly through an indirect path via communications network 314.

System 300 includes content source 316 and media guidance data source 318 coupled to communications network 314 via communication paths 320 and 322, respectively. Paths 320 and 322 may include any of the communication paths described above in connection with paths 308, 310, and 312. Communications with the content source 316 and media guidance source data source 318 may be exchanged over one or more communications paths but are shown as a single path in FIG. 3 to avoid overcomplicating the drawing. In addition, there may be more than one of each of content source 316 and media guidance data source 318, but only one of each is shown in FIG. 3 to avoid overcomplicating the drawing. (The different types of each of these sources is discussed below.) If desired, content source 316 and media guidance data source 318 may be integrated as one source device. Although communications between sources 316 and 318 with recording devices 302, 304, and 306 are shown as through communications network 314, in some embodiments, sources 316 and 318 may communicate directly with recording devices 302, 304, and 306 via communication paths (not shown) such as those described above in connection with paths 308, 310, and 312.

Content source 316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by Home Box Office, Inc. Content sources 316 may be the originator of content (e.g., a television broadcaster, a Webcast provider, etc.) or may not be the originator of content (e.g., an on-demand content provider, an Internet provider of content of broadcast programs for downloading, etc.). Content sources 316 may include cable sources, satellite providers, on-demand providers, Internet providers, over-the-top content providers, or other providers of content. Content source 316 may also include a remote media server user to store different types of content (including video content selected by a user), in a location remote from any of the recording devices. Systems and methods for remote storage of content and providing remotely stored content to recording are discussed in greater detail in connection with Ellis et al., U.S. Pat. No. 7,761,892, issued Jul. 20, 2010, which is hereby incorporated by reference herein in its entirety.

Media guidance data source 318 may provide media guidance data, such as the media guidance data described above. Media guidance data may be provided to the recording devices using any suitable approach. In some embodiments, the guidance application may be a stand-alone interactive television program guide that receives program guide data via a data feed (e.g., a continuous feed or trickle feed). Program schedule data and other guidance data may be provided to the recording on a television channel sideband, using an in-band digital signal, using an out-of-band digital signal, or by any other suitable data transmission technique. Program schedule data and other media guidance data may be provided to recording on multiple analog or digital television channels.

In some embodiments, guidance data from media guidance data source 318 may be provided to users' equipment using a client-server approach. For example, a recording device may pull media guidance data from a server, or a server may push media guidance data to a recording device. In some embodiments, a guidance application client residing on the user's equipment may initiate sessions with source 318 to obtain guidance data when needed, e.g., when the guidance data is out of date or when the recording device receives a request from the user to receive data. Media guidance may be provided to the recording with any suitable frequency (e.g., continuously, daily, a user-specified period of time, a system-specified period of time, in response to a request from recording, etc.).

Figure 4A:
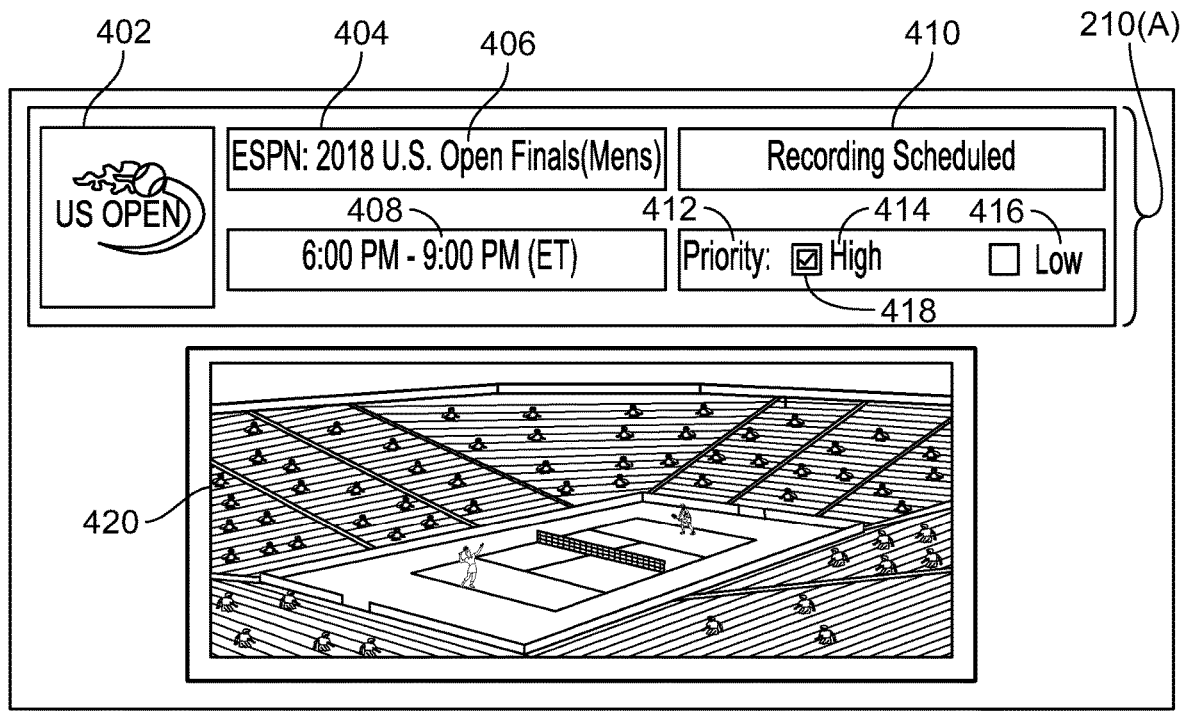
FIGS. 4A and 4B show illustrative examples of a user interface design that may be presented in accordance with some embodiments of the disclosure.
Figure 4B:
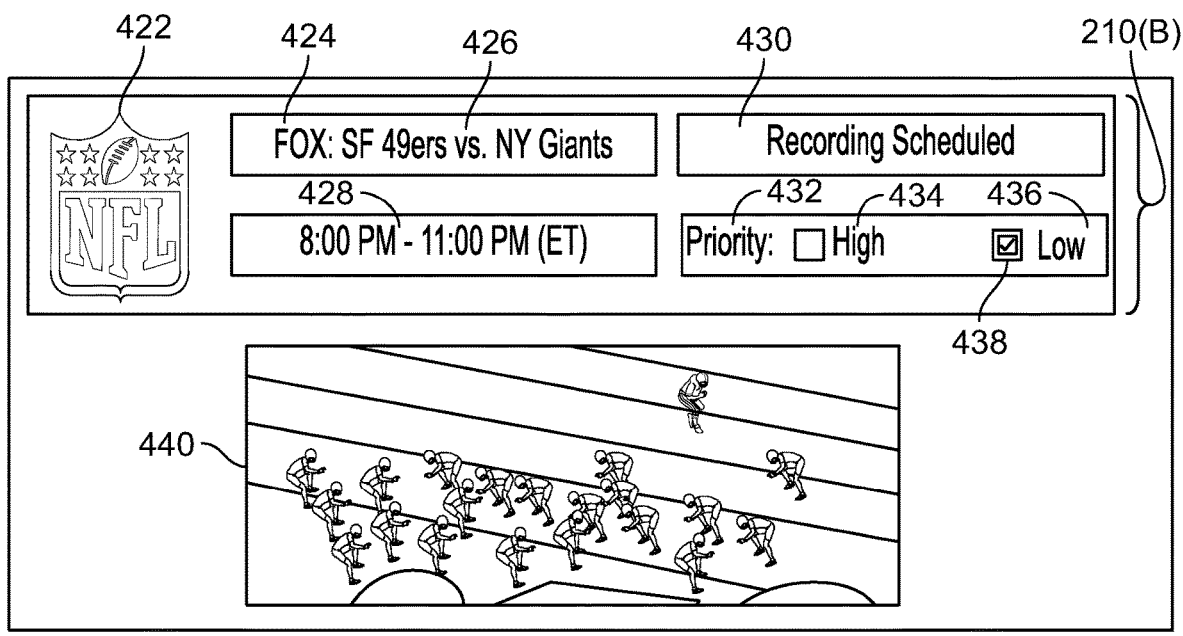

FIGS. 4A and 4B show illustrative examples of a display screen design that may be presented in accordance with some embodiments of the disclosure. The recording manager implemented on equipment device 200 may generate user input interfaces 210(A), 210(B) on display screens 400, 450 as discussed above with reference to FIG. 2. The display screens shown in FIGS. 4A-4B may be implemented on any suitable user equipment device or platform. While the displays of FIGS. 4A-4B are illustrated as full-screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or organization criteria.

FIG. 4A shows an illustrative display screen 400 having user input interface 210(A) displayed thereon. Display screen 400 displays media guide data for the higher-priority asset (e.g., 2018 U.S. Open Men's Finals match) including a content identifier 402 (e.g., U.S. Open), a source identifier 404 (e.g., channel ESPN), a program listing 406 (e.g., 2018 U.S. Open Finals (Men's)), and a scheduled broadcast time 408 (e.g., 6:00 PM-9:00 PM ET). Display screen 400 may also include user input interface 210(A) for receiving recording requests from users who wish to record linear programming (e.g., content that is scheduled to be transmitted to a plurality of user equipment devices at a predetermined time and is provided according to a schedule). As illustrated in FIG. 4A, user input interface 210(A) provides a selectable button 410 to record listed program 406. The user may also select a recording priority 412 associated with the listed program 406 via user input interface 210(A). For example, user input interface 210(A) may include a selectable high-priority option 414 and a selectable low-priority option 416. The user may select either of the options using the button 418. The display screen 400 may also include a preview screen 420 for the listed program 406 in some embodiments. In some embodiments, the recording manager may retrieve the image displayed in the preview screen 420 as the content associated with the listed program 406 to compare to the sample of the received transmission.

FIG. 4B shows another illustrative display screen 450 having user input interface 210(A) displayed thereon. Display screen 400 displays media guide data associated with the lower-priority asset (e.g., the football match) that includes a content identifier 422 (e.g., NFL game), a source identifier 424 (e.g., channel FOX), a program listing 426 (e.g., San Francisco 49ers vs. New York Giants), and a scheduled broadcast time 428 (e.g., 8:00 PM-11:00 PM ET). Display screen 450 may also include user input interface 210(A) for receiving recording requests from users who wish to record linear programming (e.g., content that is scheduled to be transmitted to a plurality of user equipment devices at a predetermined time and is provided according to a schedule). As illustrated in FIG. 4B, user input interface 210(B) provides a selectable button 430 to record listed program 426. The user may also select a recording priority 432 associated with the listed program 426 via user input interface 210(B). For example, user input interface 210(B) may include a selectable high-priority option 434 and a selectable low-priority option 436. The user may select either of the options using the button 438. The display screen 450 may also include a preview screen 440 for the listed program 406 in some embodiments.

In the example scenario shown in FIGS. 4A and 4B, the recording manager, via user input interfaces 201(A) and 210(B), receives a first higher-priority recording request to record the U.S. Open Men's Finals match and a second lower-priority recording request to record the football game between the San Francisco 49ers and the New York Giants, with both games scheduled for broadcast at the same time during the 8:00 PM-9 PM ET time period. Various systems and methods for graphically accentuating content listings are discussed in, for example, Yates, U.S. Patent Application Publication No. 2010/0153885, filed Nov. 12, 2009, which is hereby incorporated by reference herein in its entirety. A person possessing ordinary skill in the art will appreciate that the display screens 400, 450 are for illustrative purposes only and that any number of systems and methods for graphically displaying the program listings and user interfaces may be used.

Figure 5:
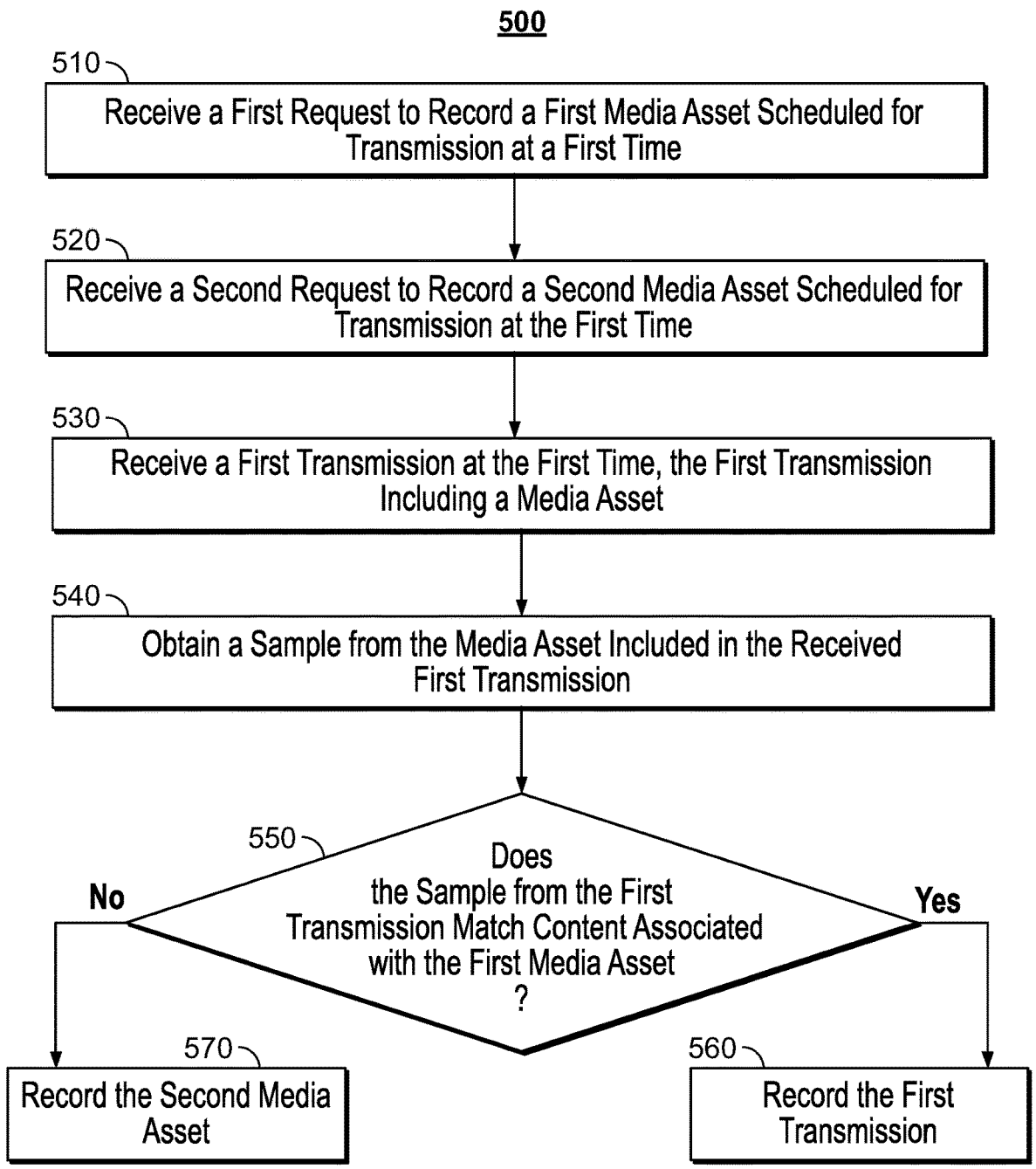
FIG. 5 is a flowchart of a detailed illustrative process for resolving recording conflicts when there are real-time changes to the scheduling of linear media content, in accordance with some embodiments of the disclosure.

FIG. 5 is a flowchart of a detailed illustrative process for resolving recording conflicts by a recording manager, implemented on control circuitry 204, when there are real-time changes to the scheduling of linear media content, in accordance with some embodiments of the disclosure. At step 510, the recording manager receives a first request to record a first media asset scheduled for transmission at a first time. For example, recording device 101, via user input interface 210A, receives a first request to record the 2018 U.S. Open Men's Finals match (i.e., first media asset). In another example, recording device 101, via user input interface 210A, receives a first request to record an episode of the television series "Game of Thrones."

At step 520, the recording manager receives a second request to record a second media asset scheduled for transmission at the first time. For example, recording device 101, via user input interface 210B, receives a second request to record the football game between the San Francisco 49ers and New York Giants (i.e., second media asset). At step 530, the recording manager, via a tuner of control circuitry 204, receives a first transmission at the first time. In the example illustrated in FIG. 4A, recording device 101 receives a first transmission at 8:00 PM (i.e., time when recording conflict begins) with the transmission including the first media asset.

At step 540, the recording manager obtains a sample from the media asset included in the received first transmission. For example, recording device 101 receives a first transmission at 8:00 PM (i.e., time when recording conflict begins) with the transmission including a media asset (on the source corresponding to the 2018 U.S. Open Men's Finals match). Before making a recording of the transmission from ESPN, the recording manager obtains a sample of the media asset included in the broadcast from ESPN and received at a tuner of recording device 101. Additional methods and systems for obtaining a sample of the media asset included in the received transmission are discussed in greater detail in connection with FIGS. 7-14.

At step 550, the recording manager compares the obtained sample to content associated with the media asset scheduled for recording (e.g., 2018 U.S. Open Men's Finals match) to determine whether to record the received transmission. Content associated with the media asset scheduled for recording may include content (e.g., phrases, audio clips, and/or video frames) retrieved from the metadata (e.g., media guide data) for the media asset scheduled for recording and/or content (phrases, audio clips, and/or video frames) retrieved from the additional media assets having metadata related to the metadata for the media asset scheduled for recording. The recording manager may use media guide data (i.e., content identifier 402 (e.g., U.S. Open Tournament), a source identifier 404 (e.g., channel ESPN), a program listing 406 (e.g., 2018 U.S. Open Finals (Men's)) associated with the higher-priority asset (i.e., 2018 U.S. Open Finals match). In some embodiments, the recording manager implemented on equipment device 200 may identify additional content associated with the higher-priority asset to perform the comparisons discussed above. For example, the recording manager may identify additional tennis matches having program information related to the program information provided by ESPN to perform a more reliable comparison with the sample of the received transmission.

Specifically, the recording manager may store, in a memory 208 of equipment device 200, a database of additional media assets that were transmitted before broadcast time 104, and their associated metadata. The recording manager may categorize the stored additional media assets based on their associated metadata (e.g., genres such as tennis, football, hockey, etc.). The recording manager, using metadata for the higher-priority asset, identifies additional media assets having metadata related to the metadata for the higher-priority asset from the database. For example, the recording manager, upon receiving higher-priority recording request 102, and based on metadata (e.g., program information) for the 2018 U.S. Open Men's Finals match, identifies other tennis matches (i.e., previously stored additional media assets) stored in the memory 208 having metadata (i.e., their respective program information) related to the metadata for the higher-priority U.S. Open match.

In some embodiments, the recording manager may begin storing additional media assets having metadata related to the metadata for the higher-priority asset after receiving the request to record the higher-priority asset but before receiving the first transmission. The recording manager may, in response to receiving a request to record the 2018 U.S. Open Men's Finals Tennis match, store additional media assets having metadata related to the 2018 U.S. Open Men's Finals Tennis match (e.g., additional broadcasts of media assets associated with the genre tennis) prior to broadcast time 104. In some embodiments, the recording manager may store samples of the additional media assets having metadata related to the metadata for the higher-priority asset.

The recording manager, using metadata for the higher-priority asset, identifies additional media assets having metadata related to the metadata for the higher-priority asset. For example, the recording manager implemented on equipment device 200, upon receiving higher-priority recording request 102, and based on metadata for the U.S. Open Finals match, identifies other tennis matches stored in memory 208 having metadata (i.e., their respective program information) related to the metadata for the higher-priority U.S. Open match. As discussed above, the recording manager determines whether the obtained sample from the received transmission matches content from the additional media assets having metadata related to metadata for the desired media asset. The recording manager determines whether the obtained sample from the received transmission matches retrieved samples from other tennis matches from the 2018 U.S. Open Tournament (i.e., content associated with the media asset scheduled for recording).

At step 560, when the sample of the media asset included in the received transmission is determined, by the control circuitry 204, to match content associated with the first media asset, the recording manager records the received transmission. The recording manager records the received transmission upon determining, using control circuitry 204, that the sample of the media asset included in the received transmission matches the program information for the U.S. Open Men's Finals match and/or content from other tennis matches from the 2018 U.S. Open Tournament. When the sample of the media asset included in the received transmission is determined to not match content associated with the first media asset at step 550, the process proceeds to step 570 and the recording manager records a second media asset instead of the received transmission. That is, the recording manager records the football game between the San Francisco 49ers and the New York Giants upon determining, using control circuitry 204, that the sample of the media asset included in the received transmission does not match other tennis matches from the 2018 U.S. Open.

It will be evident to a person skilled in the art that the steps described above with reference to FIG. 5 could be performed by any other devices shown in FIGS. 2 and 3. For example, process 500 may be performed by control circuitry 204 as instructed by a recording manager on user equipment 302, 304, 306, or recording device 101 in order to play back media.

Figure 6:
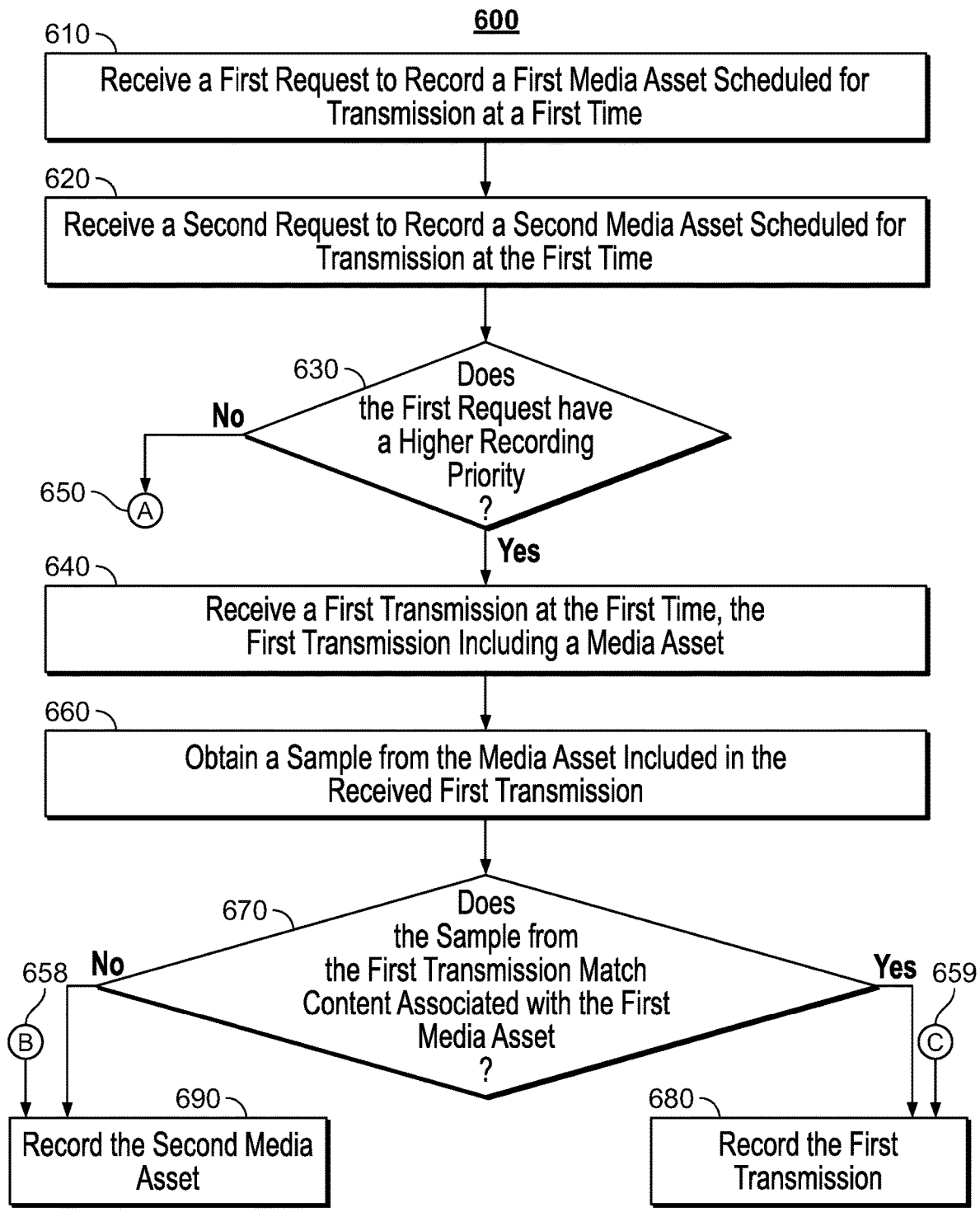
FIG. 6 is a flowchart of an illustrative process for resolving recording conflicts based on recording priority, in accordance with some embodiments of the disclosure.
Figure 6:
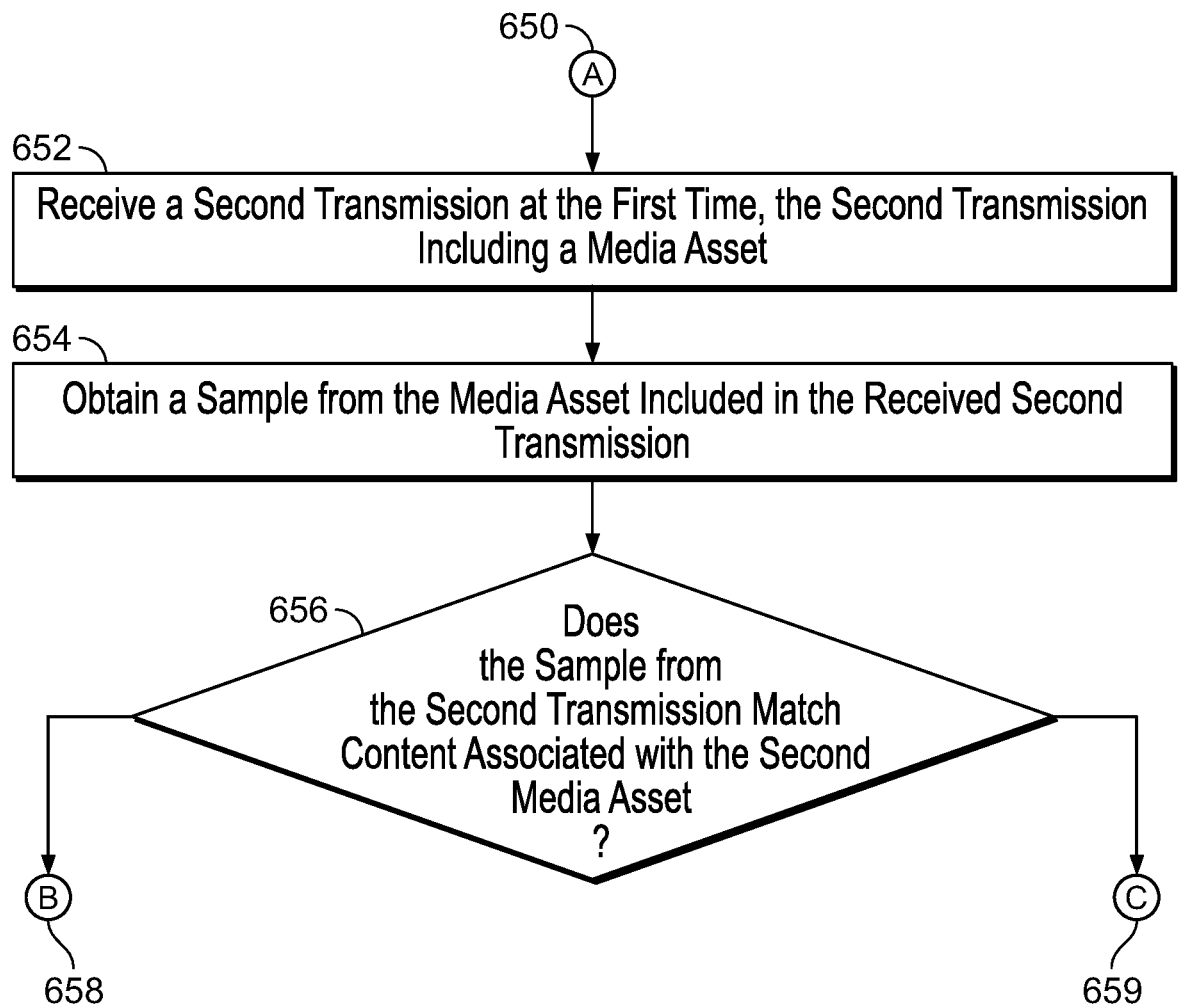

FIG. 6 is a flowchart of an illustrative process 600 for resolving recording conflicts, by a recording manager implemented on equipment device 200, via control circuitry 204, based on recording priority, in accordance with some embodiments of the disclosure. At step 610, the recording manager receives a first request to record a first media asset scheduled for transmission at a first time. For example, recording device 101, via user input interface 210A, receives a first request to record the 2018 U.S. Open Men's Finals match (i.e., first media asset). In another example, recording device 101, via user input interface 210A, receives a first request to record an episode of the television series "Game of Thrones."

At step 620, the recording manager receives a second request to record a second media asset scheduled for transmission at the first time. For example, recording device 101, via user input interface 210B, receives a second request to record the football game between the San Francisco 49ers and the New York Giants (i.e., second media asset). At step 630, the recording manager determines whether a higher recording priority has been assigned to the first request. For example, the recording manager may determine whether the user, via user input interface 210A, selected a higher recording priority 414 using the button 418 for recording the 2018 U.S. Open Men's Finals match. If at step 630, the system determines that the first request has a higher recording priority, the process proceeds to step 640. If at step 630, the system determines that the first request does not have a higher recording priority, the process proceeds to step 652 (discussed below).

At step 640, the recording manager receives a first transmission at the first time. As illustrated in FIG. 4A, recording device 101 receives a first transmission at 8:00 PM (i.e., time when recording conflict begins) with the transmission including a media asset (on the source corresponding to the higher-priority recording of the 2018 U.S. Open Men's Finals match). At step 660, the recording manager obtains a sample from the media asset included in the received first transmission. For example, recording device 101 receives a first transmission at 8:00 PM (i.e., time when recording conflict begins) with the transmission including the first media asset. Before making a higher-priority recording of the transmission from ESPN, the recording manager obtains a sample of the transmission from ESPN and received at a tuner of control circuitry 204. Additional methods and systems for obtaining a sample of the media asset included in the received transmission are discussed in greater detail in connection with FIGS. 7-14.

At step 670, the recording manager compares the obtained sample to content associated with the media asset scheduled for recording (e.g., 2018 U.S. Open Men's Finals match) to determine whether to record the received transmission.

Control circuitry 204 determines whether the obtained sample matches content from the media guide data associated with the higher-priority asset. In some embodiments, recording device 101 determines whether the obtained sample matches content from other tennis matches from the 2018 U.S. Open Tournament (i.e., content associated with the media asset scheduled for recording). Methods and systems for identifying content associated with the higher-priority asset are discussed in greater detail below in connection with FIG. 7.

At step 680, when the sample of the media asset included in the received transmission is determined, by the control circuitry 204, to match content associated with the first media asset, the recording manager records the received transmission. The recording manager records the received transmission upon determining, using control circuitry 204, when the sample of the received transmission is determined to match other tennis matches from the 2018 U.S. Open Tournament. When the sample of the received transmission is determined to not match content associated with the first media asset at step 670, the process proceeds to step 690 and the recording manager records a lower-priority second media asset instead of the received transmission. The recording manager records the lower-priority recording of the football game between the San Francisco 49ers and the New York Giants upon determining, using control circuitry 204, when the sample of the media asset included in the received transmission is determined to not match other tennis matches from the 2018 U.S. Open Tournament.

At step 652, the recording manager implemented on equipment device 200, via a tuner of control circuitry 204, receives a second transmission at the first time. For example, in the example illustrated in FIG. 4B, recording device 101 receives a second transmission at 8:00 PM (i.e., time when recording conflict begins) with the transmission including the first media asset (on the source corresponding to the football game between the San Francisco 49ers and the New York Giants). At step 654, the recording manager obtains a sample from the media asset included in the received second transmission. For instance, recording device 101 receives a second transmission at 8:00 PM (i.e., time when recording conflict begins) with the transmission including the second media asset. Before making a recording of the transmission from FOX, the recording manager obtains a sample of the transmission from FOX received at the tuner of recording device 101. Additional methods and systems for obtaining a sample of the media asset included in the received transmission are discussed in greater detail in connection with FIGS. 7-14.

At step 656, the recording manager compares the obtained sample to content associated with the media asset scheduled for recording (e.g., football game between the San Francisco 49ers and the New York Giants) to determine whether to record the received transmission. For example, recording device 101, using control circuitry 204, determines whether the obtained sample matches other football games (i.e., content associated with the media asset scheduled for recording).

When the sample of the received transmission is determined, by the control circuitry 204, to match content associated with the second media asset at step 656, the recording manager records the received second transmission at step 690. The recording manager records the received transmission upon determining, using control circuitry 204, that the sample of the received transmission is determined to match other football games. When the sample of the media asset included in the received transmission is determined to not match content associated with the second media asset at step 656, the process proceeds to step 690 and the recording manager records the first media asset instead of the received second transmission. That is, the recording manager records the lower recording priority 2018 U.S. Open Men's Finals match upon determining, using control circuitry 204, that the sample of the media asset included in the received transmission does not match other football games.

It will be evident to a person skilled in the art that the steps described above with reference to FIG. 6 could be performed by any other devices shown in FIGS. 2 and 3. For example, process 600 may be performed by control circuitry 204 as instructed by a media guidance application on user equipment 302, 304, 306, or recording device 101 in order to play back media. In addition, one or more steps of process 600 may be incorporated into or combined with one or more steps of any other process or embodiment (e.g., process 500).

Figure 7:
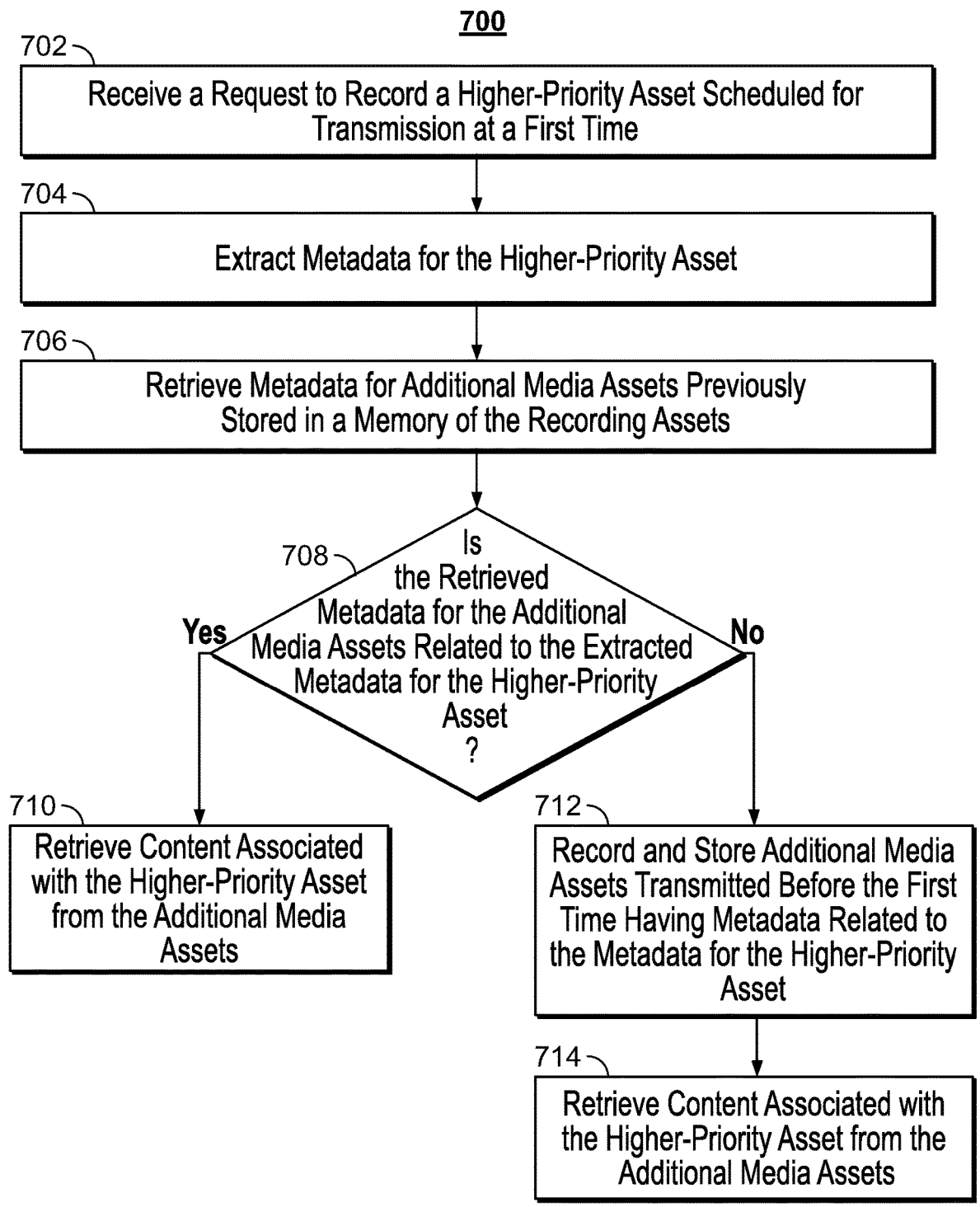
FIG. 7 is a flowchart of an illustrative process for retrieving content associated with the higher-priority asset from an additional media asset, in accordance with some embodiments of the disclosure.

FIG. 7 is a flowchart of an illustrative process 700 for retrieving content associated with the higher-priority asset by the recording manager in accordance with some embodiments of the disclosure. At step 702, the recording manager receives a request to record a higher-priority asset scheduled for transmission at a first time. For example, the recording manager receives a request to record the 2018 U.S. Open Men's Finals match scheduled for transmission from 6:00 PM-9:00 PM ET. At step 704, the recording manager implemented on equipment device 200, via control circuitry, retrieves metadata for the higher-priority asset. The recording manager extracts metadata (e.g., media guide data) for the 2018 U.S. Open Men's Finals match including a genre (i.e., Tennis) and program information (i.e., 2018 U.S. Open).

At step 706, the recording manager retrieves metadata for any additional media assets previously stored in memory 208. For example, the recording manager may retrieve metadata for previously recorded media assets that are stored in memory 208 of recording device 101. At step 708, the recording manager determines whether the retrieved metadata for the additional media assets previously stored in the memory 208 are related to the extracted metadata for the higher-priority asset. The recording manager determines whether the retrieved metadata for previously recorded media assets that are stored in memory 208 of recording device 101 are related to the extracted metadata (e.g., media guide data) for the 2018 U.S. Open Men's Finals match. If so, the process proceeds to step 710 and the recording manager retrieves content associated with the higher-priority asset from the additional media assets having metadata related to the higher-priority asset. That is, the recording manager identifies previously recorded media assets stored in memory 208 that match the genre (i.e., Tennis) or the program information (i.e., 2018 U.S. Open) and extracts content associated with the 2018 U.S. Open Men's Finals match.

If, at step 708, the recording manager determines that there are no additional media assets stored in memory 208 having metadata related to the extracted metadata for the higher-priority asset, the process proceeds to step 712. When the recording manager determines that there are no previously recorded media assets stored in memory 208 of recording device 101 that have metadata relating to the metadata for the 2018 U.S. Open Men's Finals match, the recording manager records any additional media assets transmitted before the broadcast time 104 (i.e., the first time) that has metadata (i.e., program information) related to the metadata for the 2018 U.S. Open Men's Finals match. That is, the recording manager records any other media assets having program information that matches the genre (Tennis) or the program information (2018 U.S. Open) of the 2018 U.S. Open Men's Finals match and is transmitted before the first time.

At step 714, the recording manager retrieves content associated with the higher-priority asset from the additional media assets having metadata related to the higher-priority asset. For example, the recording manager identifies previously recorded media assets stored in memory 208 that match the genre (i.e., Tennis) or the program information (i.e., 2018 U.S. Open) and extracts content associated with the 2018 U.S. Open Men's Finals match. As will be described below with reference to FIGS. 8-14, content associated with the higher-priority media asset may be phrases, audio clips, and/or video frames from the additional media assets having metadata related to the higher-priority asset.

It will be evident to a person skilled in the art that the steps described above with reference to FIG. 7 could be performed by any other devices shown in FIGS. 2 and 3. For example, process 700 may be performed by control circuitry 204 as instructed by a media guidance application on user equipment 302, 304, 306, or recording device 101 in order to play back media. In addition, one or more steps of process 700 may be incorporated into or combined with one or more steps of any other process or embodiment (e.g., processes 500 and 600).

Figure 8:
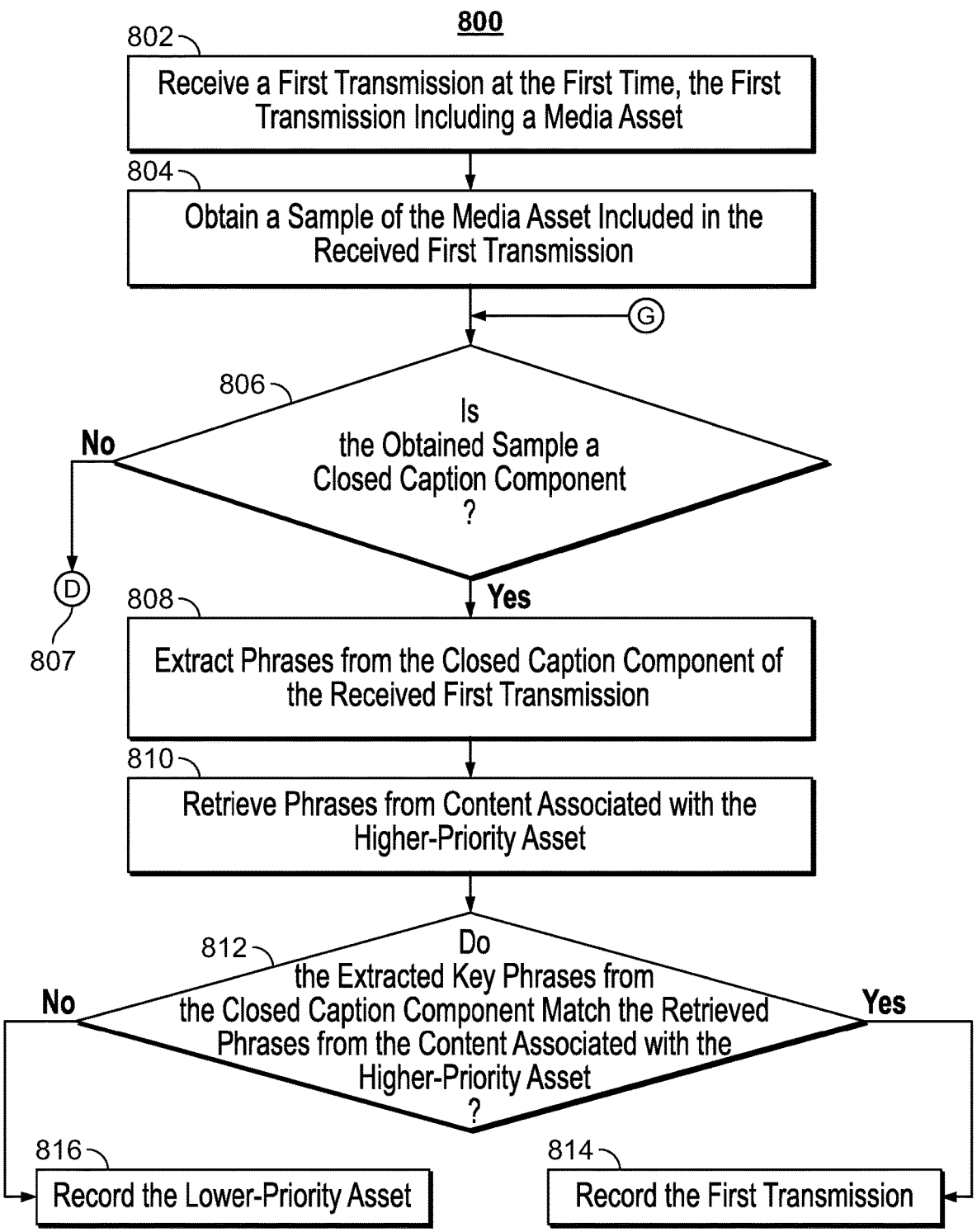
FIG. 8 is a flowchart of an illustrative process for obtaining a closed caption sample from the received transmission, in accordance with some embodiments of the disclosure.

FIG. 8 is a flowchart of an illustrative process 800 for obtaining a closed caption sample from the received transmission, via control circuitry 204, in accordance with some embodiments of the disclosure. At step 802, the recording manager receives a transmission at the first time, the first transmission including a media asset. For example, at broadcast time 104, recording device 101, via tuning circuitry of control circuitry 204, receives a transmission from ESPN. At step 804, the recording manager obtains a sample of the media asset included in the received transmission. The recording manager obtains a sample of the transmission from ESPN.

At step 806, the recording manager determines whether the obtained sample is a closed caption component of the received transmission. The recording manager, for instance, determines whether the obtained sample of the transmission from ESPN is a closed caption component. When the obtained sample of the received transmission is determined to be a closed caption component, the process proceeds to step 808. When the obtained sample of the received transmission is determined to not be a closed caption component, the process proceeds to step 807 (discussed below in connection with FIG. 14).

At step 808, the recording manager extracts phrases from the closed caption component. The recording manager may extract phrases such as character names and/or locations from the closed caption component. At step 810, the recording manager retrieves phrases from the content associated with the higher-priority asset. As discussed above, content associated with the higher-priority asset may include content (e.g., phrases, audio clips, and/or video frames) retrieved from the metadata (e.g., media guide data) for the higher-priority asset and/or content (phrases, audio clips, and/or video frames) retrieved from the additional media assets having metadata related to the metadata for the higher-priority asset. In some embodiments, the recording manager may extract phrases such as character names, locations, and/or tennis-specific vocabulary from the tennis matches played during the earlier rounds of the 2018 U.S. Open.

Similarly, in an instance where the higher-priority asset is an episode of "Game of Thrones," the recording manager may extract phrases such as character names and/or locations specific to the series "Game of Thrones" to compare the obtained closed caption component. A specific implementation of the process above is discussed in greater detail below in connection with FIGS. 9A and 9B.

At step 812, the recording manager compares the phrases extracted from the closed caption component to phrases retrieved from the program information of the first media asset and/or the additional media assets to determine whether the sample of the media asset included in the received transmission matches the content associated with the first media asset.

When the phrases extracted from the closed caption component are determined, by the control circuitry 204, to match content associated with the first media asset at step 812, the recording manager records the received transmission corresponding to the first media asset at step 814. For example, the recording manager records the received transmission from ESPN upon determining that the sample of the media asset included in the received transmission matches the content associated with the first media asset. When the phrases extracted from the closed caption component are determined, by the control circuitry 204, to not match content associated with the first media asset at step 812, the recording manager records the lower-priority asset at step 816. The recording manager records the football game between the San Francisco 49ers and the New York Giants upon determining that the sample of the media asset included in the received transmission does not match the content associated with the U.S. Open Men's Finals match.

It will be evident to a person skilled in the art that the steps described above with reference to FIG. 8 could be performed by any other devices shown in FIGS. 2 and 3. For example, process 800 may be performed by control circuitry 204 as instructed by a media guidance application on user equipment 302, 304, 306, or recording device 101 in order to play back media. In addition, one or more steps of process 800 may be incorporated into or combined with one or more steps of any other process or embodiment (e.g., processes 500, 600, and 700).

Figure 9A:
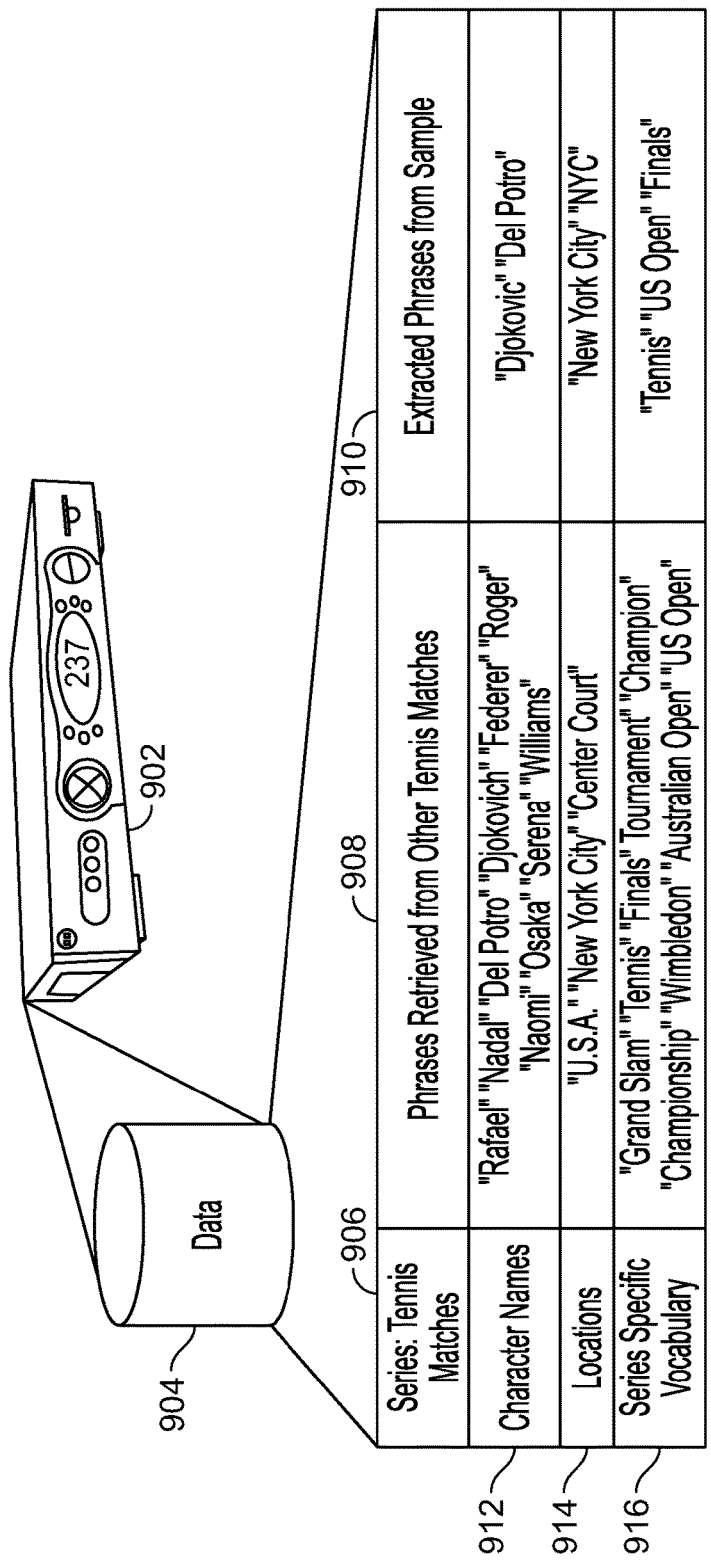
FIGS. 9A and 9B show illustrative examples of a data structure for comparing the closed caption sample to content associated with the media asset scheduled for recording, in accordance with some embodiments of the disclosure.
Figure 9B:
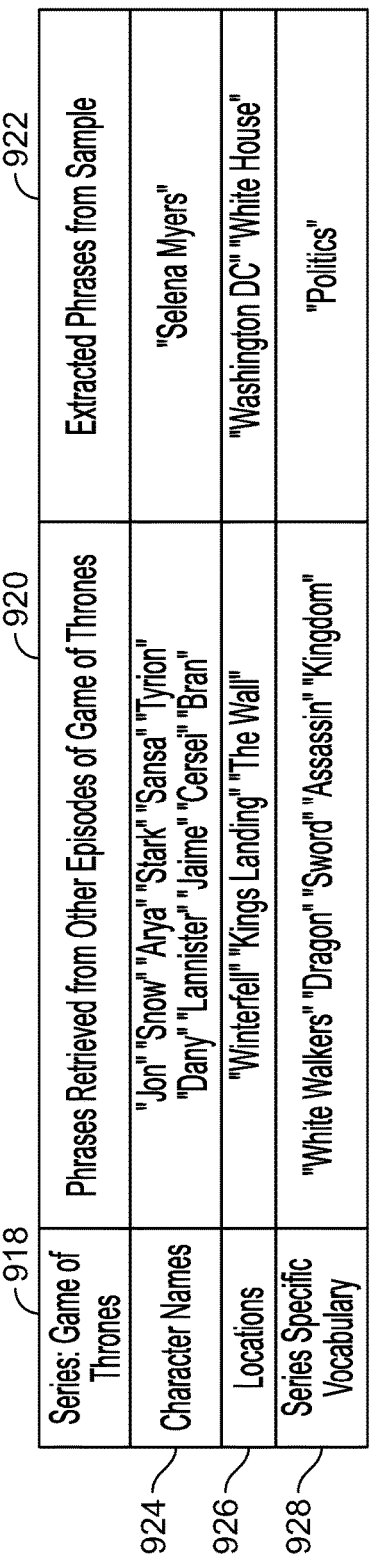

FIGS. 9A and 9B show illustrative examples of a data structure for comparing the closed caption sample to content associated with the media asset scheduled for recording, in accordance with some embodiments of the disclosure. Recording device 902 includes a memory 208 storing a plurality of data structures in database 904 storing phrases extracted from the media asset included in the received transmission and phrases retrieved from the content associated with the first media asset. As illustrated in FIG. 1, when the user makes a higher-priority request to record the 2018 U.S. Open Men's Finals match, the recording manager identifies the first media asset as belonging to a series 906 of tennis matches. As discussed above in connection with step 810 of process 800, the recording manager retrieves phrases 908 from other tennis matches (i.e., content associated with the first media asset). As illustrated in the example data structure of FIG. 9A, the recording manager retrieves phrases such as character names 912, locations 914, and series-specific vocabulary 916. For example, when the media asset scheduled for recording is the 2018 U.S. Open Men's Finals match, the retrieved phrases include character names 912 such as "Novak Djokovic," "Juan Martin Del Potro," "Rafael Nadal," etc.; locations 914 such as "New York City," "U.S.A.," and "Centre Court," etc.; and series-specific vocabulary 916 such as "Grand Slam," "Tennis,"

"Finals," etc. In addition, in the example data structure of FIG. 9A, the recording manager stores the extracted phrases from the closed caption component (as discussed above in connection with step 808 of process 800). For example, the extracted phrases from the closed caption component may include character names 912 such as "Djokovic," and "Del Potro,"; locations 914 such as "New York City,"; and series-specific vocabulary 916 such as "U.S. Open," "Tennis," and "Finals," indicating that the received transmission is the first media asset intended to be recorded.

In another illustrative example, when the user makes a higher-priority request to record an episode of the series "Game of Thrones," the recording manager identifies the first media asset as belonging to the "Game of Thrones" series 918. As discussed above in connection with step 810 of process 800, the recording manager retrieves phrases 920 from other episodes of "Game of Thrones" (i.e., content associated with the first media asset). As illustrated in the example data structure of FIG. 9B, the recording manager retrieves phrases such as character names 924, locations 926, and series-specific vocabulary 928. The retrieved phrases include, for example, character names 924 such as "Jon Snow," "Arya Stark," "Tyrion Lannister," etc.; locations 926 such as "Kings Landing," "Winterfell," and "The Wall,"; and series-specific vocabulary 916 such as "White Walkers," "Dragon," "Sword," etc. In addition, in the example data structure of FIG. 9B, the recording manager stores the extracted phrases from the closed caption component (as discussed above in connection with step 808 of process 800). The extracted phrases from the closed caption component include character names 924 such as "Selena Myers," locations 926 such as "White House,"; and series specific vocabulary 928 such as "Politics," indicating that the received transmission is not the first media asset intended to be recorded.

A person possessing ordinary skill in the art will appreciate that the above-discussed data structures in FIGS. 9A and 9B are provided for illustrative purposes only, and that any number of phrases extracted from the closed caption component of the media asset included in the received transmission may be compared to the phrases retrieved from the content associated with the first media asset.

Figure 10:
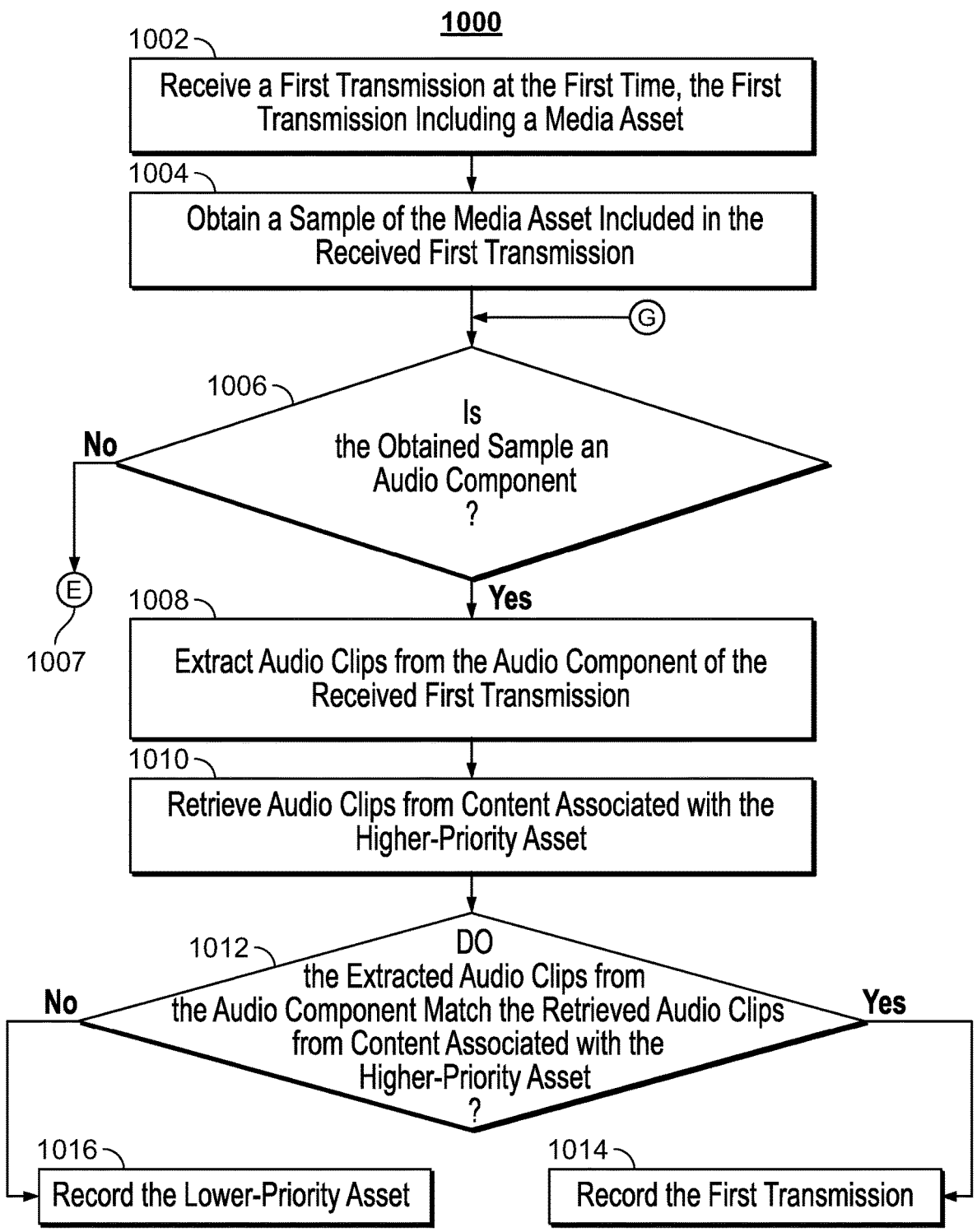
FIG. 10 is a flowchart of an illustrative process for obtaining an audio sample from the received transmission, in accordance with some embodiments of the disclosure.

FIG. 10 is a flowchart of an illustrative process 1000 for obtaining an audio sample from the received transmission by the recording manager, implemented via control circuitry 204, in accordance with some embodiments of the disclosure. At step 1002, the recording manager receives the transmission at the first time, the first transmission including a media asset. For example, at broadcast time 104, recording device 101, via tuning circuitry of control circuitry 204, receives a transmission from ESPN. At step 1004, the recording manager obtains a sample of the media asset included in the received transmission. The recording manager, for example, obtains a sample of the media asset included in the transmission from ESPN.

At step 1006, the recording manager determines whether the obtained sample is an audio component of the media asset included in the received transmission. For instance, the recording manager determines whether the obtained sample of the transmission from ESPN is one or more audio clips of the received transmission (i.e., audio component). When the obtained sample of the received transmission is determined to be an audio component, the process proceeds to step 1008. When the obtained sample of the media asset included in the received transmission is determined to not be an audio component, the process proceeds to step 1007 (discussed below in connection with FIG. 14).

At step 1008, the recording manager extracts audio clips from the audio component. The recording manager may, in some embodiments, extract audio clips to perform a vocal pitch comparison to determine whether the audio clips are spoken by the same characters. At step 1010, the recording manager retrieves audio clips from the content associated with the higher-priority asset. As discussed above, content associated with the higher-priority asset may include content (e.g., phrases, audio clips, and/or video frames) retrieved from the metadata (e.g., media guide data) for the higher-priority asset and/or content (phrases, audio clips, and/or video frames) retrieved from the additional media assets having metadata related to the metadata for the higher-priority asset. For example, the recording manager may extract audio clips of the commentators from the tennis matches played during the earlier rounds of the 2018 U.S. Open. Similarly, in an example where the program scheduled for recording is an episode of "Game of Thrones," the recording manager may extract audio clips of main characters of the series "Game of Thrones" to compare the obtained audio component.

At step 1012, the recording manager compares the audio clips extracted from the audio component to audio clips retrieved from the additional media assets to determine whether the sample of the received transmission matches the content associated with the first media asset. For example, the recording manager may identify a character name from the extracted audio clips and match the identified character name to a list of character names included in the audio clips retrieved from the additional media assets.

When the audio clips extracted from the audio component are determined, by the control circuitry 204, to match the audio clips retrieved from the additional media assets at step 1012, the recording manager records the received transmission corresponding to the first media asset at step 1014. The recording manager, for example, records the received transmission from ESPN upon determining, using control circuitry 204, that the sample of the received transmission matches the content associated with the first media asset. When the audio clips extracted from the audio component are determined to not match the audio clips retrieved from the additional media assets at step 1012, the recording manager records the lower-priority asset at step 1016. For example, the recording manager records the football game between the San Francisco 49ers and the New York Giants upon determining that the sample of the received transmission does not match the content associated with the first media asset.

It will be evident to a person skilled in the art that the steps described above with reference to FIG. 10 could be performed by any other devices shown in FIGS. 2 and 3. For example, process 1000 may be performed by control circuitry 204 as instructed by a media guidance application on user equipment 302, 304, 306, or recording device 101 in order to play back media. In addition, one or more steps of process 1000 may be incorporated into or combined with one or more steps of any other process or embodiment (e.g., processes 500, 600, 700, and 800).

Figure 11:
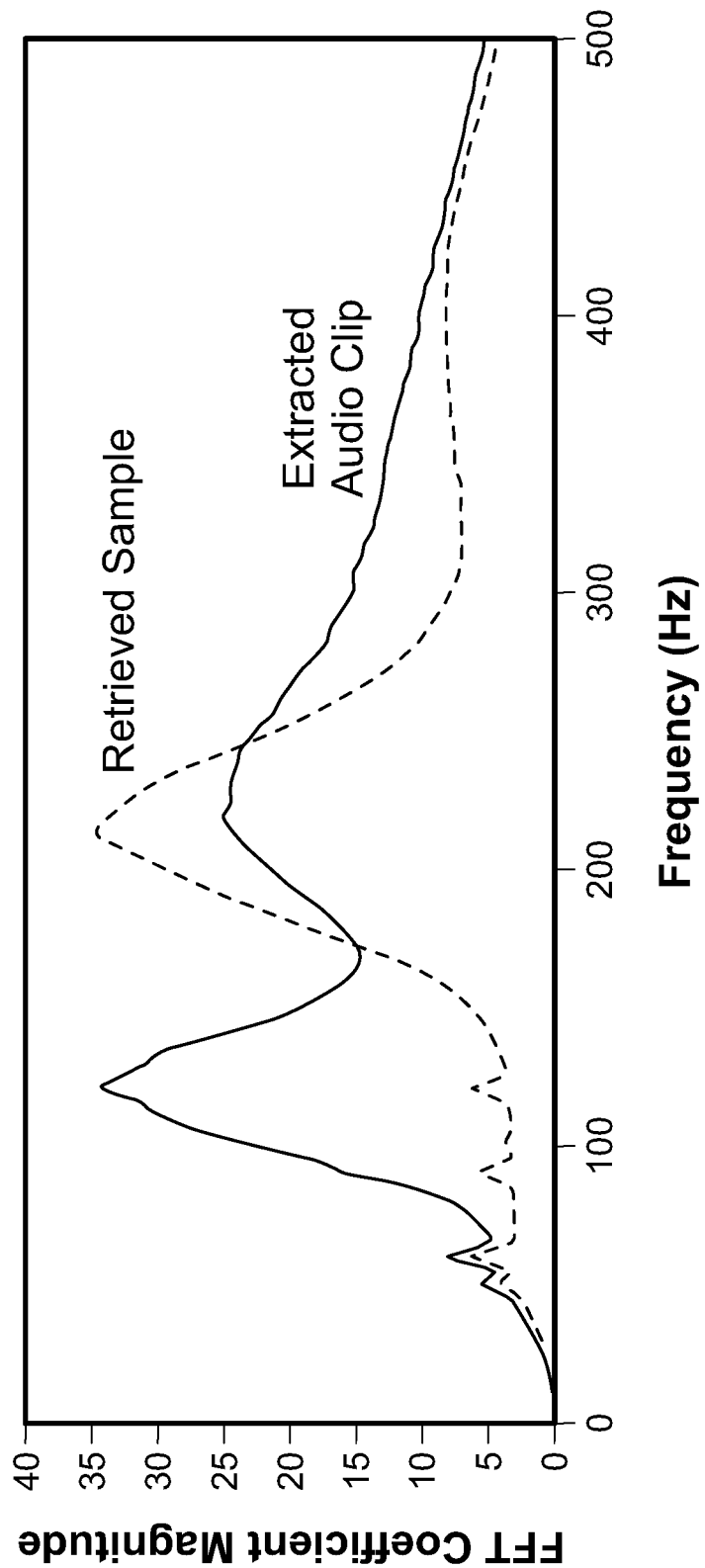
FIG. 11 is a graphical representation of a comparison of audio clips, in accordance with some embodiments of the disclosure.

FIG. 11 is a graphical representation of a comparison of audio clips, in accordance with some embodiments of the disclosure. The recording manager compares the extracted audio clips from the audio component sample of the media asset included in the received transmission with the retrieved audio clips from the additional media assets. The recording manager compares the extracted audio clips from the audio component sample of the broadcast from ESPN with the retrieved audio clips from additional tennis matches from earlier rounds of the 2018 U.S. Open Men's Finals match. In the example embodiment illustrated in FIG. 11, the recording manager performs a Fast Fourier Transform function on the audio clips and runs a comparison between the two sets of audio clips. As shown in the graph of FIG. 11, the frequency of the extracted audio clip from the audio component sample is lower than the frequency of the audio sample retrieved from the additional tennis matches. Therefore, the recording manager determines that the audio component sample of the media asset included in the received transmission does not match the audio sample retrieved from the content associated with the first media asset, and therefore records the second media asset instead.

Figure 12:
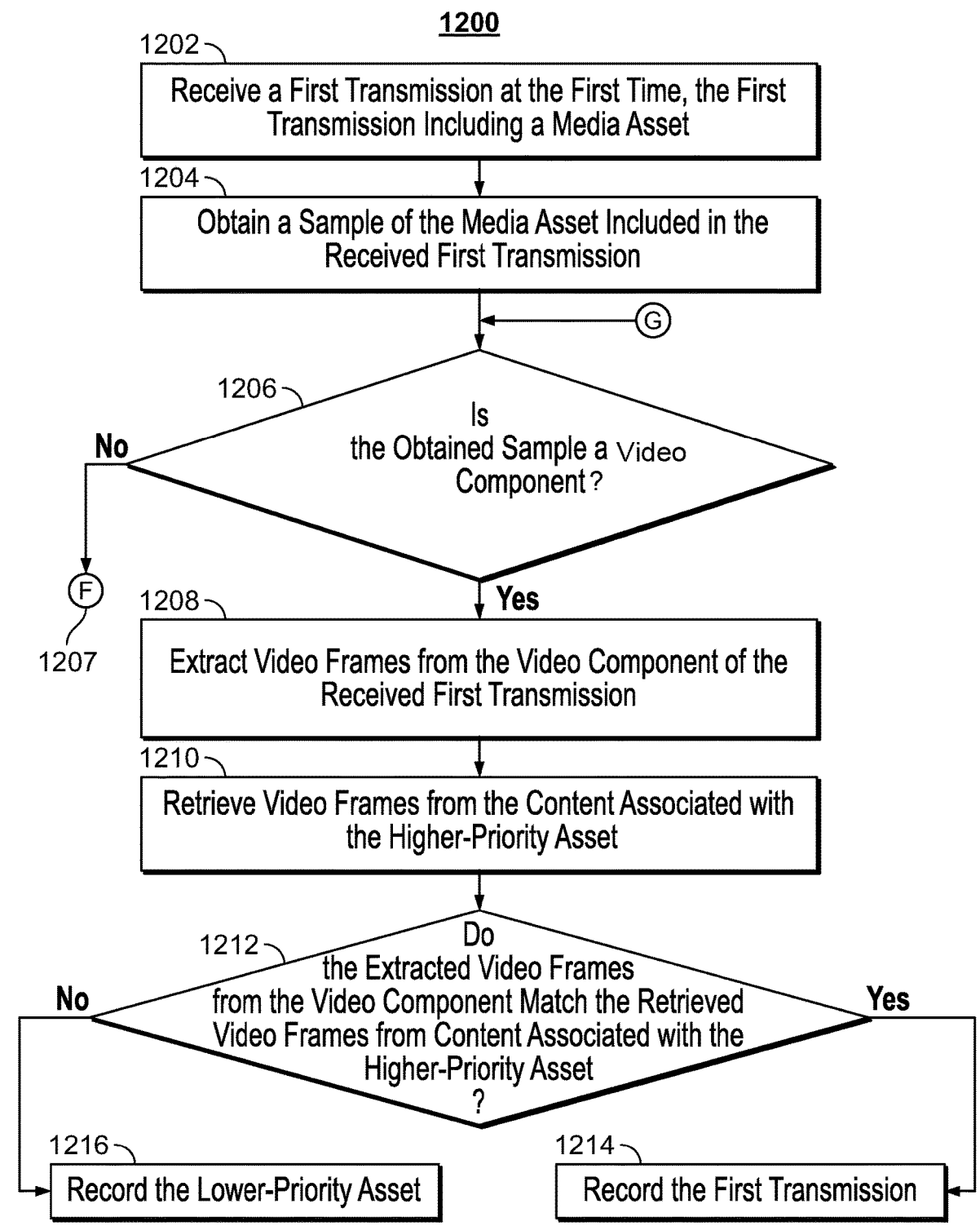
FIG. 12 is a flowchart of an illustrative process for obtaining a video sample from the received transmission, in accordance with some embodiments of the disclosure.

FIG. 12 is a flowchart of an illustrative process 1200 for obtaining a video sample from the received transmission by the recording manager, implemented on control circuitry 204, in accordance with some embodiments of the disclosure. At step 1202, the recording manager receives the transmission at the first time, the first transmission including a media asset. At step 1204, the recording manager obtains a sample of the media asset included in the received transmission. The recording manager may, for example, recording device 101 receives a transmission from ESPN and obtains a sample of the transmission from ESPN.

At step 1206, the recording manager determines whether the obtained sample is a video component of the media asset included in the received transmission. The recording manager determines whether the obtained sample of the media asset included in the transmission from ESPN is one or more video frames of the received transmission (i.e., video component). When the obtained sample of the received transmission is determined to be a video component, the process proceeds to step 1208. When the obtained sample of the received transmission is determined to not be a video component, the process proceeds to step 1207 (discussed below in connection with FIG. 14).

At step 1208, the recording manager extracts video frames from the video component. The recording manager may, for example, extract video frames for facial recognition to identify any characters appearing in the video frames. At step 1210, the recording manager retrieves content associated with the higher-priority asset. As discussed above, content associated with the higher-priority asset may include content (e.g., phrases, audio clips, and/or video frames) retrieved from the metadata (e.g., media guide data) for the higher-priority asset and/or content (phrases, audio clips, and/or video frames) retrieved from the additional media assets having metadata related to the metadata for the higher-priority asset. The recording manager may, for example, extract video frames including faces of specific players (e.g., the finals participants) from the tennis matches played during the earlier rounds of the 2018 U.S. Open. Similarly, in an example where the program scheduled for recording is an episode of "Game of Thrones," the recording manager may extract faces of main characters of the series "Game of Thrones" to compare the obtained video component. A specific implementation of the process above is discussed in greater detail below in connection with FIGS. 13A and 13B.

At step 1212, the recording manager compares the video frames extracted from the video component to video frames retrieved from the additional media assets to determine whether the sample of the media asset included in the received transmission matches the content associated with the first media asset. For example, comparing the extracted audio clips from the audio component with the retrieved audio clips from the additional media assets may include identifying a character name from the audio clips and matching the identified character name to a list of character names included in the retrieved audio clips.

When the video frames extracted from the video component are determined, by the control circuitry 204, to match video frames retrieved from the additional media assets at step 1212, the recording manager records the received transmission corresponding to the first media asset at step 1214. For example, the recording manager records the received transmission from ESPN upon determining that the sample of the media asset included in the received transmission matches the content associated with the first media asset. When the video frames extracted from the video component are determined to not match video frames retrieved from the additional media assets at step 1212, the recording manager records the lower-priority asset at step 1216. For example, the recording manager, implemented on equipment device 200, records the football game between the San Francisco 49ers and the New York Giants upon determining that the sample of the received transmission does not match the content associated with the first media asset.

It will be evident to a person skilled in the art that the steps described above with reference to FIG. 12 could be performed by any other devices shown in FIGS. 2 and 3. For example, process 1200 may be performed by control circuitry 204 as instructed by a media guidance application on user equipment 302, 304, 306, or recording device 101 in order to play back media. In addition, one or more steps of process 1200 may be incorporated into or combined with one or more steps of any other process or embodiment (e.g., process 500, 600, 700, 800, and 1000).

Figures 13A, 13B:
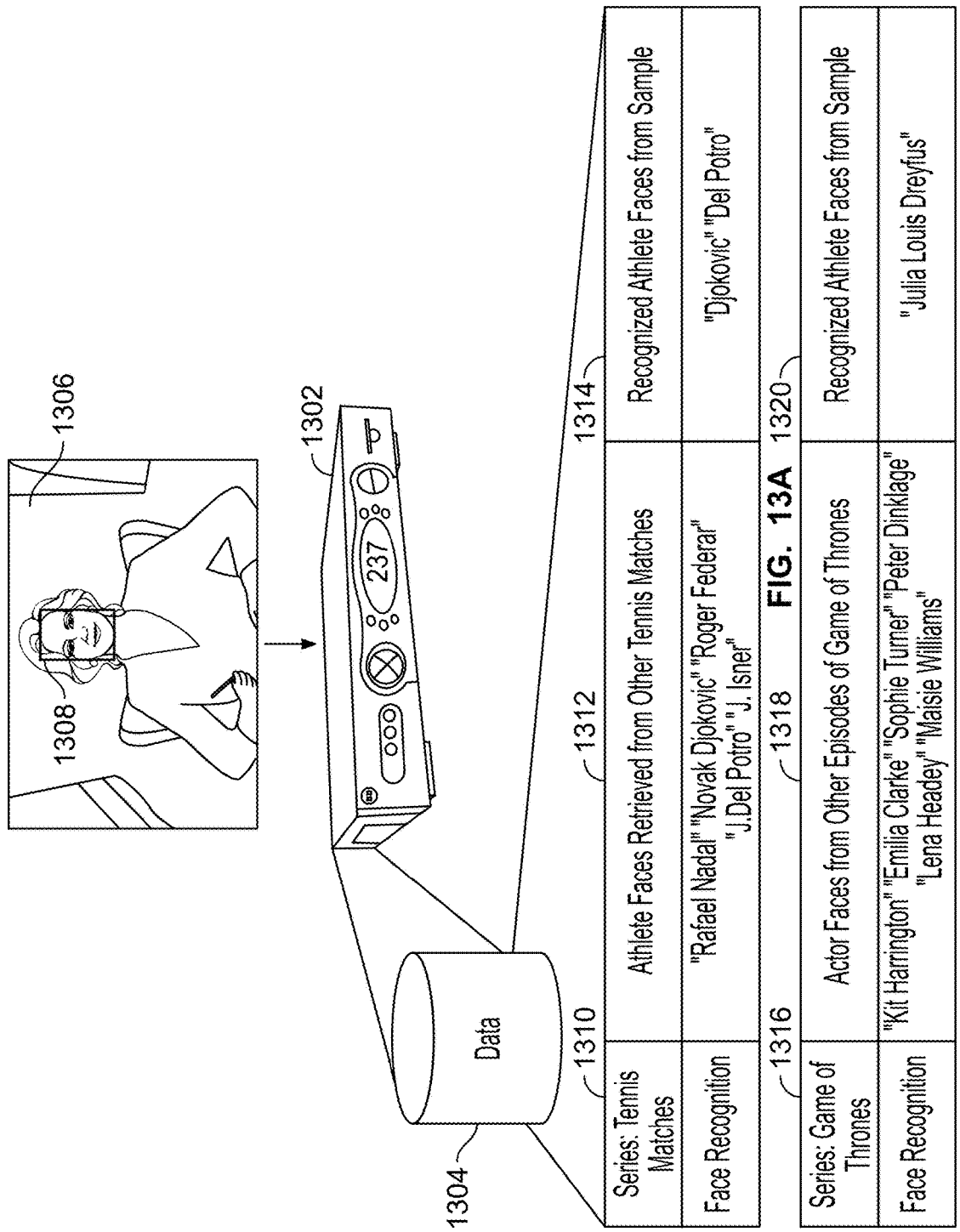
FIGS. 13A and 13B show illustrative examples of a data structure for comparing the video sample to content associated with the media asset scheduled for recording, in accordance with some embodiments of the disclosure.

FIGS. 13A and 13B show illustrative examples of a data structure for comparing the video sample to content associated with the media asset scheduled for recording, in accordance with some embodiments of the disclosure. Recording device 1302 includes a memory 208 storing a plurality of data structures in database 1304 comparing facial recognition results extracted from the media asset included in the received transmission and facial recognition data retrieved from content associated with the first media asset. For example, as illustrated in FIG. 1, when the user makes a higher-priority request to record the 2018 U.S. Open Men's Finals match, the recording manager identifies the first media asset as belonging to a series 1310 of tennis matches. As discussed above in connection with step 1210 of process 1200, the recording manager retrieves video frames from other tennis matches (i.e., content associated with the first media asset) to identify and store facial recognition data 1312 relating to a number of athletes who have appeared or are likely to appear in the 2018 U.S. Open Men's Finals. For example, as illustrated in FIG. 13A, the recording manager extracts facial recognition data for athletes such as Novak Djokovic, Juan Martin Del Potro, Roger Federer, and Rafael Nadal, among others. Finally, in the example data structure of FIG. 13A, the recording manager stores the facial recognition data extracted from the video frames of the video component (as discussed above in connection with step 1208 of process 1200). The extracted facial recognition data 1314 from the video component may, for example, include Novak Djokovic and Juan Martin Del Potro, indicating that the received transmission is the first media asset intended to be recorded.

In another illustrative example, when the user makes a higher-priority request to record an episode of the series "Game of Thrones," the recording manager identifies the first media asset as belonging to the "Game of Thrones"

series 1316. As discussed above in connection with step 1210 of process 1200, the recording manager retrieves video frames from other episodes of "Game of Thrones" (i.e., content associated with the first media asset) to identify and store facial recognition data 1318 relating to a number of main characters who have appeared or are likely to appear in the episode scheduled for recording. As illustrated in FIG. 13B, the recording manager extracts facial recognition data for characters such as Kit Harrington, Emilia Clarke, and Sophie Turner, among others. Finally, in the example data structure of FIG. 13B, the recording manager stores the facial recognition data extracted from the video frames of the video component (as discussed above in connection with step 1208 of process 1200). The extracted facial recognition data 1320 from the video component includes Julia Louis Dreyfus, indicating that the received transmission is not the first media asset intended to be recorded.

A person possessing ordinary skill in the art will appreciate that the above-discussed data structures in FIGS. 13A and 13B are provided for illustrative purposes only, and that any number of facial recognition data extracted from the video component of the media asset included in the received transmission may be compared to the video frames retrieved from the content associated with the first media asset.

Figure 14:
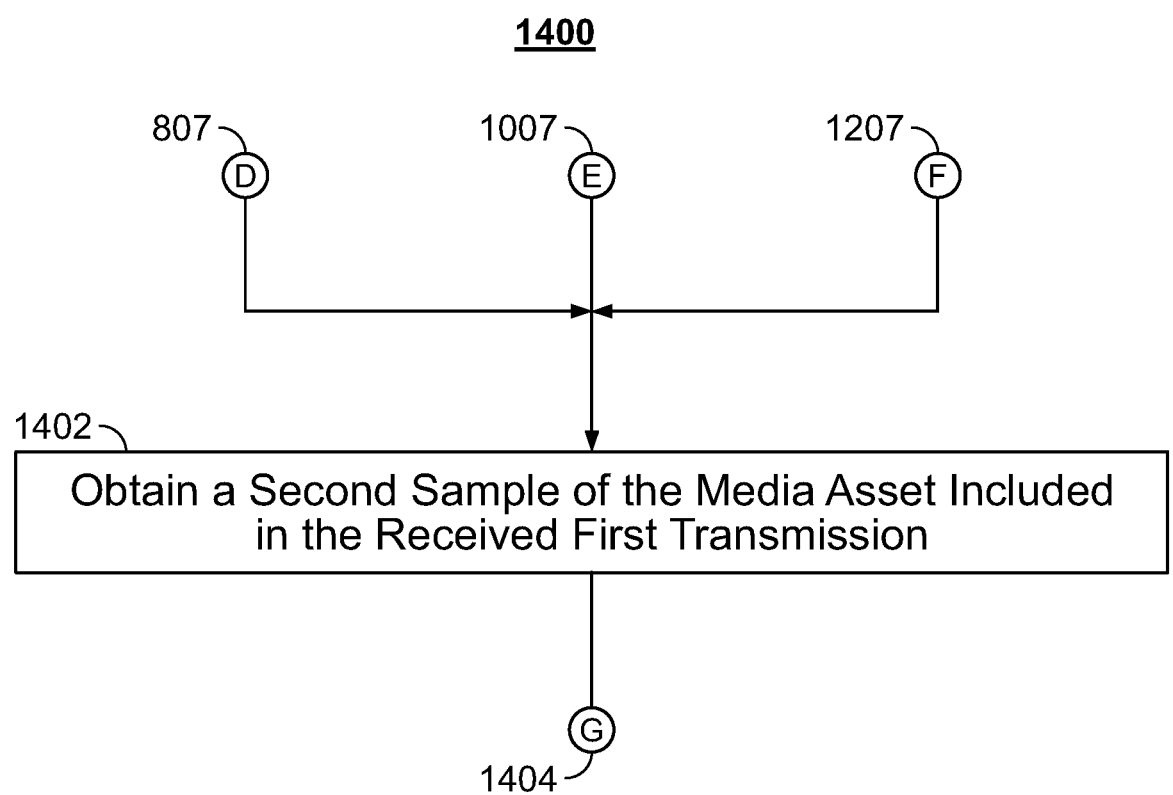
FIG. 14 is a flowchart of an illustrative process for obtaining a sample of a media asset included in a received transmission, in accordance with some embodiments of the disclosure.

FIG. 14 is a flowchart of an illustrative process for obtaining a sample of a media asset included in a received transmission, in accordance with some embodiments of the disclosure. Specifically, when processes 800, 1000, and 1200 determine at steps 807, 1007, and 1207, respectively, that the obtained sample from the media asset included in the received transmission does not include a closed caption component, an audio component, and/or a video component, the process moves to step 1402, when a second sample of the media asset included in the received transmission is obtained. At step 1404, processes 800, 1000, and 1200 are repeated for the second sample in order to determine that the intended media asset is recorded.

It will be evident to a person skilled in the art that the steps described above with reference to FIG. 14 could be performed by any other devices shown in FIGS. 2 and 3. For example, process 1400 may be performed by control circuitry 204 as instructed by a media guidance application on user equipment 302, 304, 306, or recording device 101 in order to play back media. In addition, one or more steps of process 1400 may be incorporated into or combined with one or more steps of any other process or embodiment (e.g., process 500, 600, 700, 800, 1000, and 1200).

Figure 15:
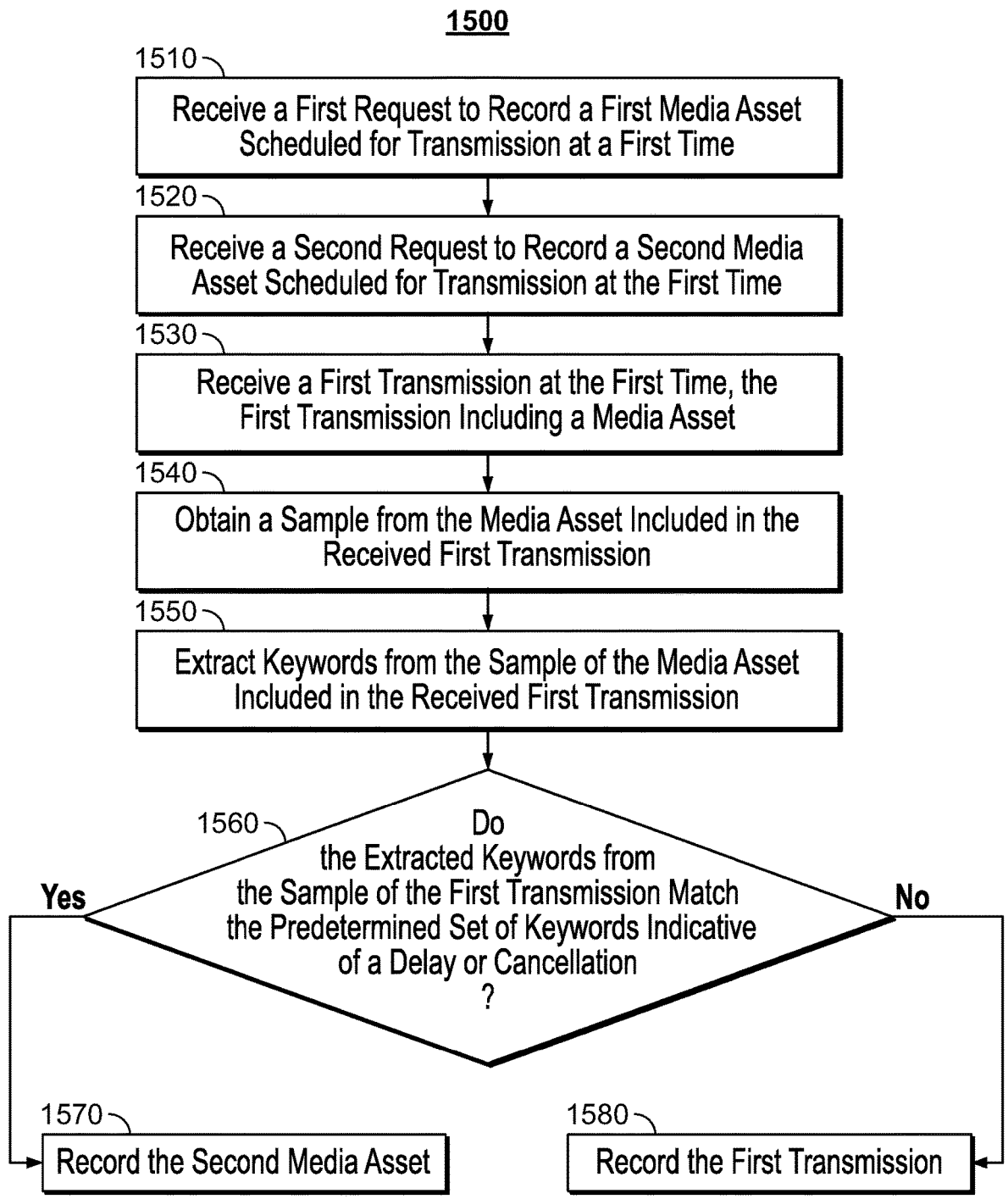
FIG. 15 is a flowchart of another illustrative process for resolving recording conflicts when there are real-time changes to the scheduling of linear media content, in accordance with some embodiments of the disclosure.

FIG. 15 is a flowchart of another illustrative process for resolving recording conflicts by a recording manager, implemented on control circuitry 204, in accordance with some embodiments of the disclosure. At step 1510, the recording manager receives a first request to record a first media asset scheduled for transmission at a first time. For example, recording device 101, via user input interface 210A, receives a first request to record the 2018 U.S. Open Men's Finals match (i.e., first media asset).

At step 1520, the recording manager receives a second request to record a second media asset scheduled for transmission at the first time. For example, recording device 101, via user input interface 210B, receives a second request to record the football game between the San Francisco 49ers and the New York Giants (i.e., second media asset). At step 1530, the recording manager via a tuner of control circuitry 204, receives a first transmission at the first time. As illustrated in FIG. 4A, recording device 101 receives a first transmission at 8:00 PM (i.e., time when recording conflict begins) with the transmission including the first media asset.

At step 1540, the recording manager obtains a sample from the media asset included in the received first transmission. For example, recording device 101 receives a first transmission at 8:00 PM (i.e., time when recording conflict begins) with the transmission including a media asset (on the source corresponding to the 2018 U.S. Open Men's Finals match). Before making a recording of the transmission from ESPN, the recording manager obtains a sample of the media asset included in the broadcast from ESPN and received at a tuner of recording device 101. Additional methods and systems for obtaining a sample of the received transmission will be apparent to a person possessing ordinary skill in the art as discussed above in connection with FIGS. 7-14.

At step 1550, the recording manager extracts keywords from the sample of the media asset included in the received transmission. For example, before making a recording of the transmission from ESPN, the recording manager extracts keywords from the sample of received transmission from ESPN. In some embodiments, the recording manager may use process 800 discussed above to extract keywords from the obtained sample.

At step 1560, the recording manager, implemented on control circuitry 204, compares the obtained sample to a predetermined set of keywords indicative of a delay or cancellation to determine whether to record the received transmission. The recording manager determines whether the extracted keywords include phrases such as "delay" or "postponed" or "canceled" to determine whether to record the media asset included in the first received transmission. Specific embodiments of the above process are discussed below in connected with FIG. 16.

When the sample of the received transmission is determined to match the predetermined set of keywords indicative of delay or cancellation at step 1560, the process proceeds to step 1570, and the recording manager records a second media asset instead of the received transmission. The recording manager records the football game between the San Francisco 49ers and the New York Giants upon determining when the sample of the received transmission is determined to match the predetermined set of keywords indicative of delay or cancellation. At step 1580, when the sample of the media asset included in the received transmission is determined, by the control circuitry 204, to not match the predetermined set of keywords indicative of delay or cancellation, the recording manager records the received transmission corresponding to the first media asset. For example, the recording manager records the received transmission upon determining that the sample of the media asset included in the received transmission does not match the predetermined set of keywords indicative of delay or cancellation.

It will be evident to a person skilled in the art that the steps described above with reference to FIG. 15 could be performed by any other devices shown in FIGS. 2 and 3. For example, process 1500 may be performed by control circuitry 204 as instructed by a media guidance application on user equipment 302, 304, 306, or recording device 101 in order to play back media. In addition, one or more steps of process 1500 may be incorporated into or combined with one or more steps of any other process or embodiment (e.g., process 500, 600, 700, 800, 1000, 1200, and 1400).

Figure 16:
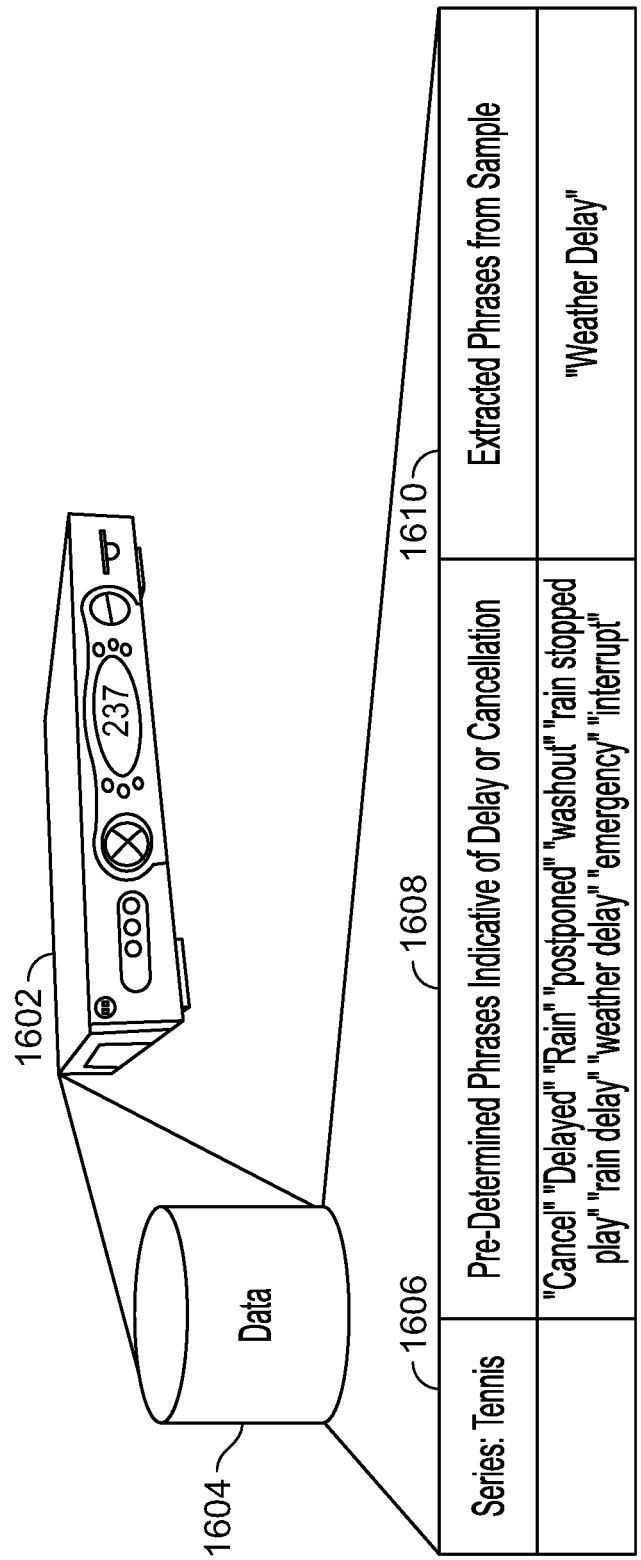
FIG. 16 is an illustrative example of a data structure for comparing phrases from a sample of the received transmission to keywords indicative of delay or cancellation, in accordance with some embodiments of the disclosure.

FIG. 16 is an illustrative example of a data structure for comparing phrases from a sample of the received transmission to keywords indicative of delay or cancellation, in accordance with some embodiments of the disclosure. Recording device 1602 includes a memory 208 storing a plurality of data structures in database 1604 storing phrases extracted from the media asset included in the received transmission and predetermined phrases indicative of a delay or cancellation of the scheduled recording. As illustrated in FIG. 1, when the user makes a higher-priority request to record the 2018 U.S. Open Men's Finals match, the recording manager identifies the first media asset as belonging to a series 1606 of tennis matches. As discussed above in connection with process 1500, the recording manager stores a predetermined list of keywords and phrases 1608 indicative of a delay or cancellation of the scheduled recording. As illustrated in FIG. 16, the recording manager stores a list of predetermined words and phrases such as "cancel," "delay," "rain delay," "emergency," and "postponed," among others. Finally, in the example data structure of FIG. 16, the recording manager stores phrases extracted from the obtained sample of the media asset included in the received transmission (as discussed above in connection with step 1560 of process 1500). The extracted phrases 1610 from the obtained sample include "rain stopped play" and "weather delay," indicating that the received transmission is likely not the first media asset intended to be recorded.

A person possessing ordinary skill in the art will appreciate that the above-discussed data structures in FIG. 16 are provided for illustrative purposes only, and that any number of methods (e.g., such as processes 800, 1000, and 1200) may be used to determine whether the sample of the media asset included in the received transmission includes an indication that the received transmission is not the first media asset intended to be recorded. For example, the recording manager, implemented on control circuitry 204, may analyze video frames from a video component of the media asset included in the received transmission to determine whether the video frames include an indication that the received transmission is not the first media asset intended to be recorded.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiments herein, and flowcharts or examples relating to any one embodiment may be combined with any other embodiments in a suitable manner, done in different orders, or done in parallel. Furthermore, it should be noted that while a first step may be based on and/or in response to a second step, such relationship does not preclude additional steps occurring between the first and second steps. In addition, the systems and methods described herein may be performed in real-time. It should also be noted the systems and/or methods described above may be applied to or used in accordance with other systems and/or methods.

What is claimed is:

1. A method comprising:
    receiving a request to store a media asset from a source during a defined time period;
    determining a genre of the media asset associated with the request based on metadata of the media asset;
    obtaining a sample from the source during the defined time period;
    determining a genre of the sample by comparing the sample to a plurality of media assets known to belong to the genre of the media asset associated with the request;
    determining whether the genre of the media asset associated with the request matches the genre of the sample;
    in response to determining that the genre of the media asset associated with the request does not match the genre of the sample, adjusting the request; and
    storing data according to the adjusted request.

2. The method of claim 1, wherein the sample is a closed caption component, the method comprising:
    extracting phrases from the closed caption component of the media asset;
    retrieving phrases from the media asset associated with the request; and
    comparing the extracted phrases with the retrieved phrases to determine whether the sample of the media asset matches the media asset associated with the request.

3. The method of claim 1, wherein the sample is an audio component, the method comprising:
    extracting audio clips from the audio component of the media asset;
    retrieving audio clips from the media asset associated with the request; and
    comparing the extracted audio clips with the retrieved audio clips to determine whether the sample of the media asset matches the media asset associated with the request.

4. The method of claim 3, wherein the comparing the extracted audio clips with the retrieved audio clips to determine whether the sample of the media asset matches the media asset associated with the request comprises:
    identifying a character name from the extracted audio clip; and
    matching the identified character name to a list of character names included in the retrieved audio clips.

5. The method of claim 1, wherein the sample is a video component, the method comprising:
    extracting video frames from the video component of the media asset;
    retrieving video frames from the media asset associated with the request; and
    comparing the extracted video frames with the retrieved video frames to determine whether the sample of the media asset matches the media asset associated with the request.

6. The method of claim 5, wherein the comparing the extracted video frames with the retrieved video frames to determine whether the sample of the media asset matches the media asset associated with the request comprises:
    performing a facial recognition program to identify a character included in both the extracted video frames and the retrieved video frames.

7. The method of claim 1, wherein the determining whether the sample matches media asset associated with the request comprises:
    determining that the sample and the media asset associated with the request are the same and/or exceed a threshold level of similarity.

8. The method of claim 1, wherein the adjusting the request comprises:
    delaying and/or canceling the storage of the media asset.

9. The method of claim 1, comprising:
    extracting metadata from the sample and the media asset associated with the request, wherein the determining whether the sample matches media asset associated with the request comprises:
    comparing the extracted metadata from the sample with the extracted metadata from the media asset associated with the request.

10. The method of claim 1, comprising:
- extracting from the sample and the media asset associated with the request at least one of a character name, a location, a content specific word, a phrase from other content of a similar type, or a phrase extracted from the sample;
- storing the extracted data in a data structure;
- associating in the data structure at least one of the character name, the location, or the content specific word with at least one of the phrase from other content of the similar type, or the phrase extracted from the sample; and
- comparing the at least one of the character name, the location, or the content specific word in the data structure associated with the at least one of the phrase from other content of the similar type, or the phrase extracted from the sample in order to determine whether the sample matches media asset associated with the request.

11. A system comprising:
circuitry configured to:
- receive a request to store a media asset from a source during a defined time period;
- determine a genre of the media asset associated with the request based on metadata of the media asset;
- obtain a sample from the source during the defined time period;
- determine a genre of the sample by comparing the sample to a plurality of media assets known to belong to the genre of the media asset associated with the request;
- determine whether the genre of the media asset associated with the request matches the genre of the sample;
- in response to determining that the genre of the media asset associated with the request does not match the genre of the sample, adjust the request; and
- store data according to the adjusted request.

12. The system of claim 11, wherein the sample is a closed caption component, the circuitry configured to:
- extract phrases from the closed caption component of the media asset;
- retrieve phrases from the media asset associated with the request; and
- compare the extracted phrases with the retrieved phrases to determine whether the sample of the media asset matches the media asset associated with the request.

13. The system of claim 11, wherein the sample is an audio component, the circuitry configured to:
- extract audio clips from the audio component of the media asset;
- retrieve audio clips from the media asset associated with the request; and
- compare the extracted audio clips with the retrieved audio clips to determine whether the sample of the media asset matches the media asset associated with the request.

14. The system of claim 13, wherein the circuitry configured to compare the extracted audio clips with the retrieved audio clips to determine whether the sample of the media asset matches the media asset associated with the request is configured to:
- identify a character name from the extracted audio clip; and
- match the identified character name to a list of character names included in the retrieved audio clips.

15. The system of claim 11, wherein the sample is a video component, the circuitry configured to:
- extract video frames from the video component of the media asset;
- retrieve video frames from the media asset associated with the request; and
- compare the extracted video frames with the retrieved video frames to determine whether the sample of the media asset matches the media asset associated with the request.

16. The system of claim 15, wherein the circuitry configured to compare the extracted video frames with the retrieved video frames to determine whether the sample of the media asset matches the media asset associated with the request is configured to:
- perform a facial recognition program to identify a character included in both the extracted video frames and the retrieved video frames.

17. The system of claim 11, wherein the circuitry configured to determine whether the sample matches media asset associated with the request is configured to:
- determine that the sample and the media asset associated with the request are the same and/or exceed a threshold level of similarity.

18. The system of claim 11, wherein the circuitry configured to adjust the request is configured to:
- delay and/or cancel the storage of the media asset.

19. The system of claim 11, wherein the circuitry is configured to:
- extract metadata from the sample and the media asset associated with the request, wherein the circuitry configured to determine whether the sample matches media asset associated with the request is configured to:
- compare the extracted metadata from the sample with the extracted metadata from the media asset associated with the request.

20. The system of claim 11, wherein the circuitry is configured to:
- extract from the sample and the media asset associated with the request at least one of a character name, a location, a content specific word, a phrase from other content of a similar type, or a phrase extracted from the sample;
- store the extracted data in a data structure;
- associate in the data structure at least one of the character name, the location, or the content specific word with at least one of the phrase from other content of the similar type, or the phrase extracted from the sample; and
- compare the at least one of the character name, the location, or the content specific word in the data structure associated with the at least one of the phrase from other content of the similar type, or the phrase extracted from the sample in order to determine whether the sample matches media asset associated with the request.

* * * * *